(12) United States Patent
Zhao et al.

(10) Patent No.: US 12,485,113 B2
(45) Date of Patent: Dec. 2, 2025

(54) PHARMACEUTICAL USE OF (E)-3-ARYLHETEROCYCLYLPROP-2-ENOIC ACID DERIVATIVES

(71) Applicant: MEDCURIUS INC., Shanghai (CN)

(72) Inventors: Xuyang Zhao, Shanghai (CN); Jun Wen, Shanghai (CN)

(73) Assignee: MEDCURIUS INC., Shanghai (CN)

( * ) Notice: Subject to any disclaimer, the term of this patent is extended or adjusted under 35 U.S.C. 154(b) by 499 days.

(21) Appl. No.: 18/011,499

(22) PCT Filed: Jun. 18, 2021

(86) PCT No.: PCT/CN2021/100763
§ 371 (c)(1),
(2) Date: Dec. 19, 2022

(87) PCT Pub. No.: WO2021/259143
PCT Pub. Date: Dec. 30, 2021

(65) Prior Publication Data
US 2023/0285372 A1    Sep. 14, 2023

(30) Foreign Application Priority Data

Jun. 22, 2020 (CN) .......... 202010563509.2
May 28, 2021 (CN) .......... 202110596581.X

(51) Int. Cl.
| | | |
|---|---|---|
| A61K 31/4402 | (2006.01) | |
| A61K 9/00 | (2006.01) | |
| A61K 31/4164 | (2006.01) | |
| A61K 31/421 | (2006.01) | |
| A61K 31/426 | (2006.01) | |
| A61K 31/4409 | (2006.01) | |
| A61K 31/505 | (2006.01) | |
| A61P 25/16 | (2006.01) | |
| A61P 25/28 | (2006.01) | |

(52) U.S. Cl.
CPC ........ *A61K 31/4402* (2013.01); *A61K 9/0019* (2013.01); *A61K 31/4164* (2013.01); *A61K 31/421* (2013.01); *A61K 31/426* (2013.01); *A61K 31/4409* (2013.01); *A61K 31/505* (2013.01); *A61P 25/16* (2018.01); *A61P 25/28* (2018.01)

(58) Field of Classification Search
CPC .............. A61K 31/4402; A61K 9/0019; A61K 31/4164; A61K 31/421; A61K 31/426; A61K 31/4409; A61K 31/505; A61K 31/4439; A61P 25/16; A61P 25/28; A61P 3/10; A61P 5/14; A61P 9/00; A61P 9/04; A61P 9/10; A61P 9/12; A61P 11/00; A61P 11/06; A61P 13/12; A61P 17/06; A61P 19/02; A61P 21/00; A61P 25/14; A61P 27/02; A61P 29/00; A61P 37/02; A61P 37/06; C07D 213/55; C07D 213/56; C07D 213/57
See application file for complete search history.

(56) References Cited

PUBLICATIONS

CAS Registry No. 2243-53-0 (entered STN on Nov. 16, 1984) (Year: 1984).*
Ray of sunshine helps boost brain power. natureindex. https://www.nature.com/nature-index/article/10.1016/j.cell.2018.04.014, accessed Aug. 14, 2025; published Nov. 29, 2018 (Year: 2018).*
Wang Lun et al. "Identification and optimization of piperine analogues as neuroprotective agents for the treatment of Parkinson's disease via the activation of Nrf2/keap1 pathway" *European Journal of Medicinal Chemistry*, vol. vol. 199, May 5, 2020 (May 5, 2020), 112385 pp. 1-21.
Turpaev Kyril et al. "Aromatic malononitriles stimulate the resistance of insulin-producing beta-cells to oxidants and inflammatory cytokines" *European Journal of Pharmacology*, May 10, 2016 (May 10, 2016), pp. 69-80.
Davies Thomas G. et al. "Monoacidic Inhibitors of the Kelch-like ECH-Associated Protein 1: Nuclear Factor Erythroid 2-Related Factor 2 (KEAP1:NRF2) Protein-Protein Interaction with High Cell Potency Identified by Fragment-Based Discovery" *Journal of Medicinal Chemistry*, Mar. 31, 2016 (Mar. 31, 2016), pp. 3991-4006.
Turpaev. Kyril et al. "Benzylidenemalononitrile compounds as activators of cell resistance to oxidative stress and modulators of multiple signaling pathways. A structure-activity relationship study" *Biochemical Pharmacology*, Jun. 2, 2011 (Jun. 2, 2011), pp. 535-547.
PCT/CN2021/100763, International Search Report and Written Opinion, dated Sep. 24, 2021, 2 pages—English, 6 pages—Chinese.

* cited by examiner

*Primary Examiner* — Joseph K Mckane
*Assistant Examiner* — David M Shim
(74) *Attorney, Agent, or Firm* — Andrew F. Young, ESQ.; NOLTE LACKENBACH SIEGEL

(57) ABSTRACT

The present application relates to the pharmaceutical use of a class of (E)-3-arylheterocyclyl prop-2-enoic acid derivatives. Such compounds are a class of new Nrf2 activators, which effectively activate Nrf2 signaling pathway to produce the effects of resisting oxidative stress, resisting neuritis, and enhancing mitochondrial function and biogenesis, thereby protecting nerve cells, and same can be used to treat neurodegenerative diseases and stroke. In addition, such new Nrf2 activators can also be used to treat autoimmune diseases, diabetes, nephropathy, and other chronic diseases.

20 Claims, 4 Drawing Sheets

PHARMACEUTICAL USE OF (E)-3-ARYLHETEROCYCLYLPROP-2-ENOIC ACID DERIVATIVES

CROSS REFERENCE TO RELATED APPLICATIONS

This application relates to and claims priority from PCT Ser. no.: PCT/CN202/1100763 filed Jun. 18, 2021, the entire contents of which are incorporated herein by reference, which in turn claims priority to CN Ser. no.: 202010563509.2 filed Jun. 22, 2020 and from CN Ser. No.: 202110596581.X filed May 28, 2021.

BACKGROUND OF THE INVENTION

1. Field of the Invention

The application relates to a class of new Nrf2 activators. Such compounds effectively activate Nrf2 signaling pathway to produce the effects of resisting oxidative stress, resisting neuritis, and enhancing mitochondrial function and biogenesis, thereby protecting nerve cells. Thus, they can be useful for the treatment of multiple sclerosis (MS), Alzheimer's disease (AD), Parkinson's disease (PD), Huntington's disease (HD), amyotrophic lateral sclerosis (ALS), Friedrich's ataxia (FRDA), spinal muscular atrophy (SMA), neuromyelitis optica (NMO), and spinocerebellar ataxia (SCA) and other neurodegenerative diseases, and stroke. In addition, such new Nrf2 activators can also be used to treat autoimmune diseases, diabetes, nephropathy, and other chronic diseases. The application also relates to a method for preparing the compounds.

2. Description of the Related Art

Neurodegenerative diseases are incurable and characterized by progressive degeneration and/or death of nerve cells, which leads to memory loss, cognitive dysfunction or motor dysfunction. Oxidative stress, neuritis, and mitochondrial dysfunction are common characteristics in the neurodegenerative diseases. Alzheimer's disease (AD) and Parkinson's disease (PD) are two of the most common neurodegenerative diseases. There is no drug for the cure of AD and PD. Worse still, there is no drug for slowing the progression of AD and PD. Drugs for AD and PD available at present only help to improve symptoms of patients with AD and PD.

Multiple sclerosis (MS) is traditionally considered as an autoimmune disease, so medications used to treat patients with MS are immunosuppressive agents. However, it was later found and clinically proven that dimethyl fumarate was effective in the treatment of MS. Thus, dimethyl fumarate was approved for a new drug for the treatment of MS in 2013. The success of dimethyl fumarate in treating MS has excited a lot of interest in medical industry, since it activates Nrf2 signaling pathway to produce the effects of resisting oxidative stress, resisting neuritis, and enhancing mitochondrial function and biogenesis, thereby protecting nerve cells and achieving the therapeutic effect of MS. Therefore, it is considered that the Nrf2 activators can slow the progression of the neurodegenerative diseases, and it shows a promising prospect for treating such diseases (Brandes et al. ASN Neuro 2020, 12(2),1). Stroke also involves damage to and death of nerve cells, so the Nrf2 activators are also considered to be an effective alternative for the treatment of such diseases (Brandes et al. ASN Neuro 2020, 12(2),1). At present, dimethyl fumarate is in the phase II clinical trial for the treatment of amyotrophic lateral sclerosis (ALS), a neurodegenerative disease (Vucic et al. Medicine 2020,99 (6), 1); another Nrf2 activator, RTA408 (Omaveloxolone), has been in the Phase II/III clinical trial for the treatment of Frederick's Ataxia (FRDA), a neurodegenerative disease and has shown encouraging results: it has induced Nrf2 signaling pathway in patients, and has significantly improved symptoms of the nervous system and muscle strength (Friedrich's Ataxia News, updated January 162020). A new class of Nrf2 activators is provided in WO2019042301 (Zhao et al.). Compound I-25 has shown good efficacy in animal models of MS (EAE models), animal models of AD, animal models of PD and animal models of stroke, demonstrating the possibility of treating multiple diseases with one drug. In addition, Nrf2 activators are also believed to be used to treat autoimmune diseases, diabetes, nephropathy, and other chronic diseases (Cuadrado et al. Pharmacol Rev 2018, 70 (2), 348). It is reported that the Nrf2 activator, Bardoxolone methyl, has shown positive results in the phase III clinical trial of treating chronic kidney disease, significantly improving kidney function and delaying the progression of the kidney disease, and bringing hope to those patients with the chronic kidney disease (Healio/Nephrology/Chronic Kidney Disease, Nov. 27, 2019).

SUMMARY OF THE INVENTION

In a first aspect, the application provides a use of a compound of Formula (I) or a pharmaceutically acceptable salt thereof for the preparation of drugs for the treatment of various disorders associated with Nrf2 activators, wherein,

(I)

$R^1$ is —COOR$^3$, —CONR$^4$R$^5$, —CON(OCH$_3$)CH$_3$, —CONHCOOR$^6$, or —CN;

$R^3$ is hydrogen or $C_1$-$C_6$ alkyl;

each of $R^4$ and $R^5$ is independently selected from hydrogen or $C_1$-$C_6$ alkyl;

$R^6$ is $C_1$-$C_6$ alkyl;

$R^2$ is pyridinyl, $R^7$ substituted pyridinyl, pyrimidinyl, $R^8$ substituted pyrimidinyl, imidazolyl, $R^9$ substituted imidazolyl, oxazolyl, $R^{10}$ substituted oxazolyl, thiazolyl or $R^{11}$ substituted thiazolyl;

$R^7$ is 1-4 substituents, each independently selected from $C_1$-$C_6$ alkyl;

$R^8$ is 1-3 substituents, each independently selected from $C_1$-$C_6$ alkyl;

$R^9$ is 1-3 substituents, each independently selected from $C_1$-$C_6$ alkyl;

$R^{10}$ is 1-2 substituents, each independently selected from $C_1$-$C_6$ alkyl;

$R^{11}$ is 1-2 substituents, each independently selected from $C_1$-$C_6$ alkyl; and a carbon-carbon double bond is E configurational.

In some embodiments, each of $R^3$, $R^4$, $R^5$ and $R^6$ is independently selected from methyl or ethyl.

In some embodiments, $R^2$ is selected from the group consisting of pyridinyl, pyrimidinyl, imidazolyl, 1-methylimidazol-2-yl, oxazolyl, oxazolyl substituted with methyl, thiazolyl or thiazolyl substituted with methyl.

In some embodiments, each of $R^3$, $R^4$, $R^5$ and $R^6$ is independently selected from methyl or ethyl, and $R^2$ is pyridinyl.

In some embodiments, each of $R^3$, $R^4$, $R^5$ and $R^6$ is independently selected from methyl or ethyl, and $R^2$ is oxazolyl substituted with methyl.

In some embodiments, each of $R^3$, $R^4$, $R^5$ and $R^6$ is independently selected from methyl or ethyl, and $R^2$ is thiazolyl substituted with methyl.

In some embodiments, $R^1$ is —COOCH$_3$, —COOCH$_2$CH$_3$, —CON(OCH$_3$)CH$_3$, —CON(CH$_3$)$_2$ or —CN, $R^2$ is pyridinyl.

In some embodiments, $R^1$ is —COOCH$_3$, —COOCH$_2$CH$_3$, —CON(OCH$_3$)CH$_3$, —CON(CH$_3$)$_2$ or —CN, $R^2$ is oxazolyl substituted with methyl.

In some embodiments, $R^1$ is —COOCH$_3$, —COOCH$_2$CH$_3$, —CON(OCH$_3$)CH$_3$, —CON(CH$_3$)$_2$ or —CN, $R^2$ is thiazolyl substituted with methyl.

"Alkyl" means a univalent saturated hydrocarbon chain having a specified number of carbon atoms. For example, $C_1$-$C_6$ alkyl refers to alkyl having 1 to 6 carbon atoms. Alkyl may be linear chain or branched chain. A representative branched chain alkyl has one, two, or three branched chains. Alkyl comprises but is not limited to methyl, ethyl, propyl (n-propyl and isopropyl) and butyl (n-butyl, isobutyl, sec-butyl and tert-butyl).

The term "independently" means that when more than one substituent are selected from a plurality of possible substituents, these substituents may be the same or different. In other words, each substituent is selected from an entire group of possible substituents.

This application also includes various isomers of the compound of formula (I) and mixtures thereof. The term "isomer" refers to compounds that have the same composition and molecular weight but exhibit different physical and/or chemical properties. Structural differences may be that they are structurally different (geometric isomers) or that they have the ability to render in a plane that rotates polarized light (stereoisomers). The compounds of formula (I) contain one or more asymmetric centers (also called chiral centers), and therefore present as individual enantiomers, diastereoisomers, or other stereoisomeric forms or mixtures thereof. All such isomeric forms, including mixtures thereof, are included in the scope of the present application.

The chiral centers may also exist in substituents such as alkyl. When the stereochemistry of the chiral centers, existing in formula (I) or in any chemical structures described in this application, is not specified, the structure intends to cover any stereoisomer and all mixtures thereof. Therefore, the compound of formula (I) containing one or more chiral centers can be used as racemic mixtures, mixtures rich in enantiomers, or as pure single stereoisomers corresponding to isomers.

A single stereoisomer of a compound of formula (I) containing one or more asymmetric centers can be split by a method known to those skilled in the art. For example, such split can be carried out by: (1) forming diastereoisomeric salts, complexes or other derivatives; (2) selectively reacting with stereoisomer specific reagents, such as enzymatic oxidation or reduction reactions; or (3) gas phase-liquid phase or liquid phase chromatography in a chiral environment, for example, on a chiral carrier such as silica gel bound with a chiral ligand or in the presence of a chiral solvent. It should be understood by those skilled in the art that when the required stereoisomer is converted into another chemical entity through the above-mentioned separation operation, the step of releasing the required form is further required. Optionally, the specific stereoisomers may be synthesized by asymmetric synthesis using optically active reagents, substrates, catalysts, or solvents, or converted from one enantiomer to another enantiomer by asymmetric conversion.

As used herein, the "pharmaceutically acceptable" refers to such compounds, substances, compositions and dosage forms, which are suitable for contact with human and animal tissues within the scope of reasonable medical judgment, without excessive toxicity, stimulation or other problems or complications, and are commensurate with a reasonable benefit/risk ratio.

Those skilled in the art understand that the pharmaceutically acceptable salts of the compound of formula (I) can be prepared. These pharmaceutically acceptable salts can be prepared in situ during the final separation and purification of the compound or by treating purified compounds in the form of free acids or free bases with appropriate bases or acids, respectively.

It should be understood that the present application covers all combinations and specific combinations of the embodiments described above in the present application.

In some embodiments, specific examples of the compound of the present application comprise the following compounds:

I-1
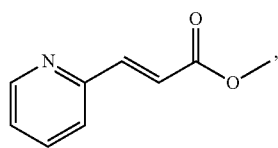

I-2
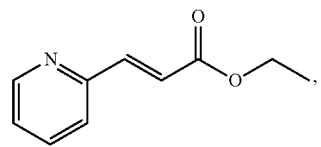

I-3
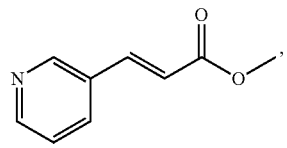

I-4
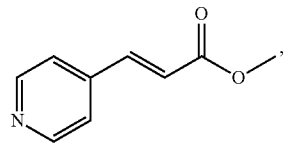

I-5
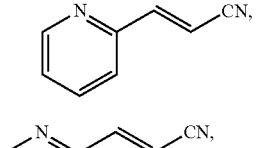

I-5 HCl
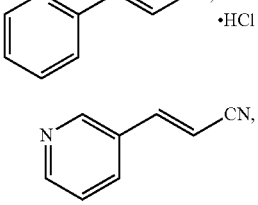

I-6

-continued
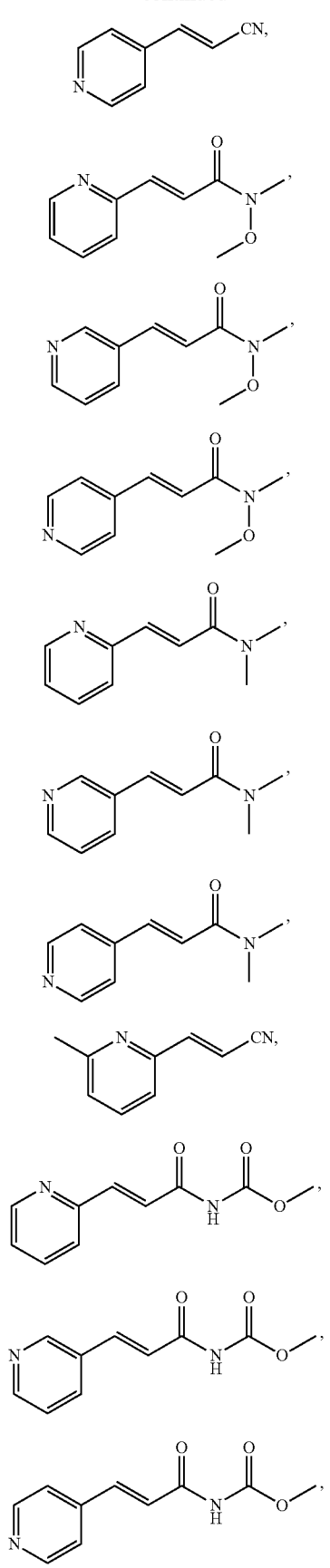
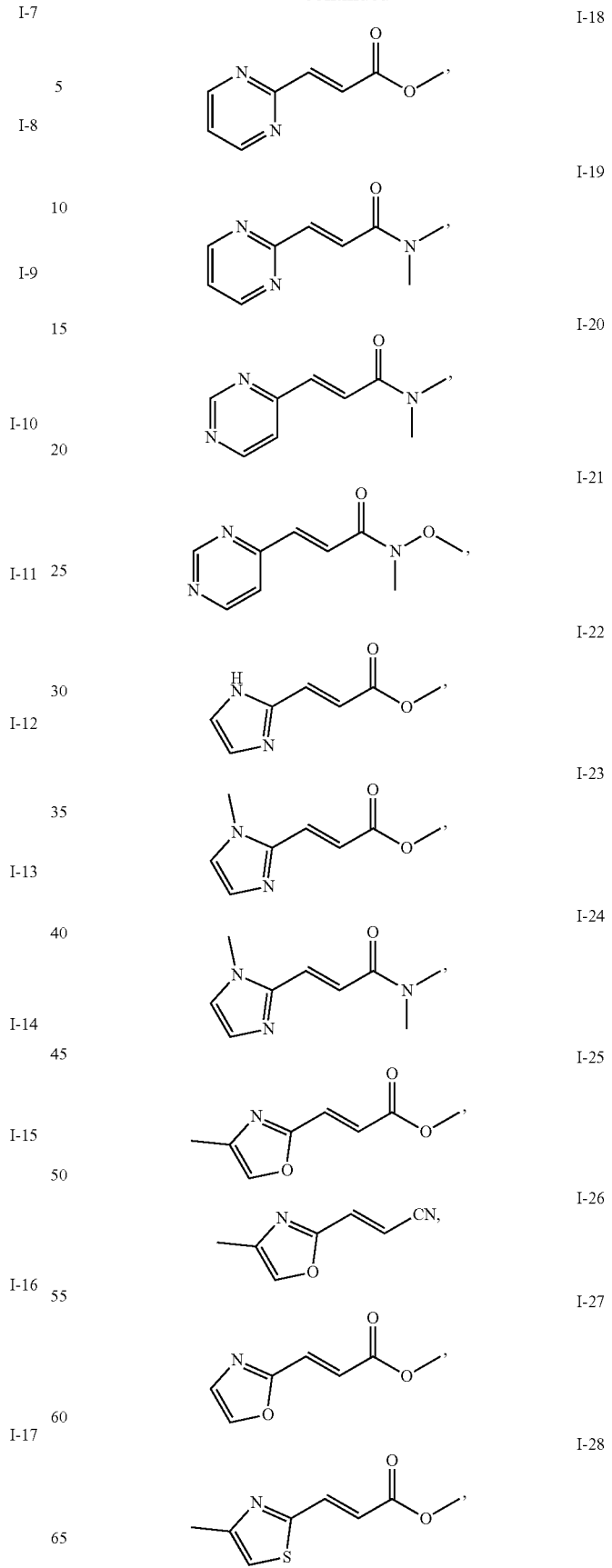

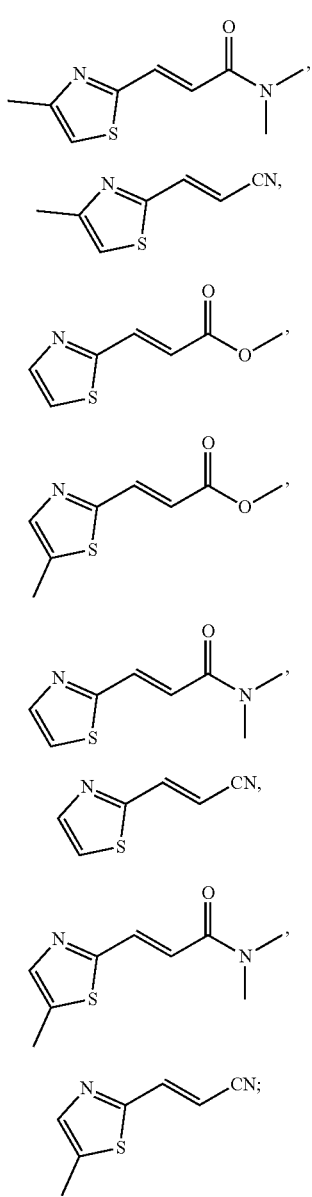

In a second aspect, the application provides a pharmaceutical composition comprising an effective dosage of the compound of formula (I) or the pharmaceutically acceptable salt thereof, and comprising a pharmaceutically acceptable carrier compatible with the compound of formula (I). The application also provides a use of the pharmaceutical composition for the preparation of drugs for treating various diseases associated with Nrf2 activators.

The pharmaceutically acceptable carrier is a conventional pharmaceutical carrier in the field, and can be any suitable physiologically or pharmaceutically acceptable pharmaceutical excipients. The pharmaceutical excipients are conventional pharmaceutical excipients in the field, preferably including pharmaceutically acceptable excipients, fillers or diluents.

More preferably, the pharmaceutical composition contains 0.01 to 99.99% of the compound of Formula (I) or the pharmaceutically acceptable salt thereof and 0.01 to 99.99% of the pharmaceutically acceptable carrier, and the percentage is a mass percentage of the pharmaceutical composition.

The pharmaceutical composition described in this application are various conventional dosage forms in the field, including: (1) oral administration, such as tablets, capsules, small capsules, pills, lozenges, powders, syrups, elixirs, suspensions, solutions and emulsions; (2) inhalation administration, such as dry powder, aerosol, suspensions and solutions; (3) intravenous administration, such as water injection and sterile powder for injection; (4) non-intestinal administration, such as sterile solutions, suspensions and powders for reconstitution; (5) transdermal administration, such as transdermal patches; (6) rectal administration, such as suppository; (7) topical administration, such as cream, ointments, lotion, solutions, paste, spray, foam and gel.

The dosage of the pharmaceutical composition of the application used for treatment may be varied, depending on the patient's age and illness conditions. The pharmaceutical composition is administered once or several times per day.

Furthermore, the diseases associated with Nrf2 activators include but are not limited to neurodegenerative disease, cardiovascular and cerebrovascular diseases, respiratory diseases, autoimmune diseases, diabetes, nephropathy or eye diseases.

Furthermore, the neurodegenerative disease comprises multiple sclerosis (MS), Alzheimer's disease (AD), Parkinson's disease (PD), Huntington's disease (HD), amyotrophic lateral sclerosis (ALS), Friedrich's ataxia (FRDA), spinal muscular atrophy (SMA), neuromyelitis optica (NMO), and spinocerebellar ataxia (SCA), etc.

Furthermore, the diseases associated with Nrf2 activators are cardiovascular and cerebrovascular diseases, respiratory diseases, autoimmune diseases, diabetes, nephropathy or eye diseases; wherein the cardiovascular and cerebrovascular diseases comprise stroke, atherosclerosis, hypertension and heart failure; the respiratory diseases comprise chronic obstructive pulmonary disease (COPD), asthma, fibrosis, chronic and acute asthma, lung diseases secondary to environmental exposure, acute lung infection and chronic lung infection; the autoimmune diseases comprise multiple sclerosis (MS), inflammatory bowel disease, internal rheumatoid arthritis, psoriasis, vitiligo, systemic lupus erythematosus, Hashimoto's thyroiditis and inflammatory diseases; the nephropathy comprises diabetic nephropathy, chronic nephropathy and acute kidney injury; the eye diseases comprise age-related macular degeneration (AMD), diabetic retinopathy (DR) and uveitis.

Furthermore, mode of administration for the drugs comprises oral administration, intravenous administration, inhalation administration or topical administration.

We found a new type of Nrf2 activators. Such compounds provided in the present application effectively activates Nrf2 signaling pathway to produce the effects of resisting oxidative stress, resisting neuritis, and enhancing mitochondrial function and biogenesis, thereby protecting nerve cells, the same can be used to treat neurodegenerative diseases and stroke. In addition, such type of Nrf2 activators can also be used to treat autoimmune diseases, diabetes, nephropathy, and other chronic diseases.

DETAILED DESCRIPTION

Figure 1:
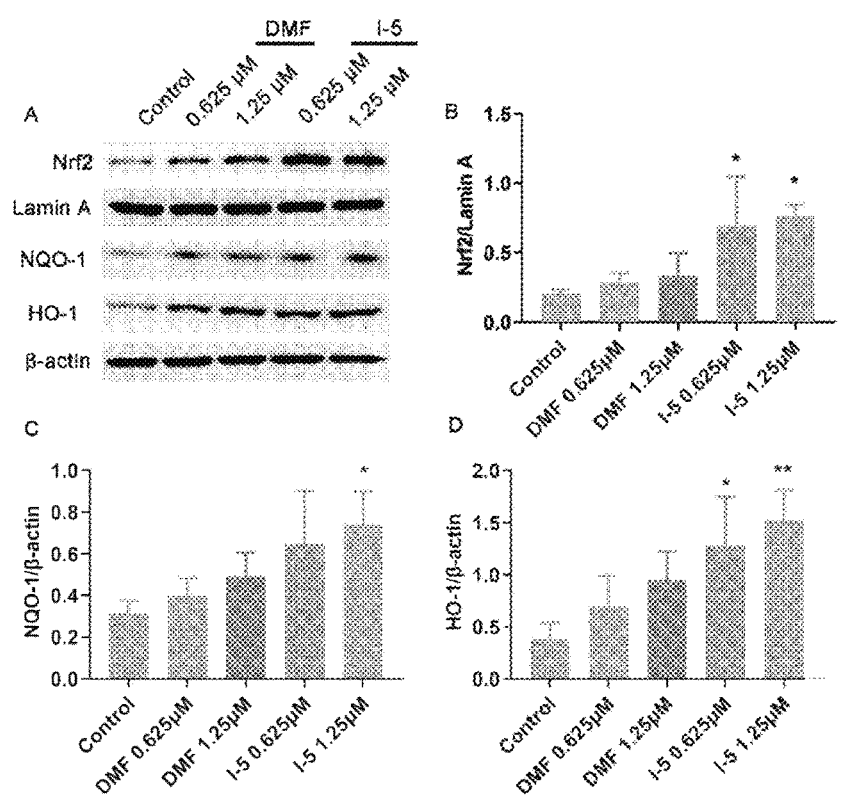
FIG. 1 shows the activation of Nrf2 signaling pathway by I-5. A: a representative picture of the effects of I-5 on Nrf2, NQO-1 and HO-1 protein levels. B: the effect of I-5 on Nrf2 protein level in nucleus; C: the effect of I-5 on NQO-1 protein level in cytoplasm. D: the effect of I-5 on HO-1 protein level in cytoplasm. *, P<0.05; ** P<0.01 vs control group. N=3.

In order to make objects, technical solutions and advantages become more apparent, the technical solutions in the present invention will be described hereinafter with reference to the particular embodiments.

If not specifically defined, the terms used in the application have meanings generally accepted by those skilled in the art. Furthermore, some of the terms used in the application are defined as follows:

DMF: dimethyl fumarate
L-DOPA or L-dopa: levodopa
TH: tyrosine hydroxylase
L-Glu: L-glutamic acid In the following examples, all temperatures are in Celsius, unless otherwise specified; all starting materials and reagents are commercially available, unless otherwise specified. The commercially available starting materials and reagents are directly used without further purification, unless otherwise specified.

$^1$H NMR spectrum is measured with a Bruker instrument (400 MHz), and the chemical shift is expressed in ppm. Tetramethylsilane is used as an internal standard (0.00 ppm). $^1$H NMR is represented as follows: s=single peak, d=double peak, t=triple peak, m=multiple peak, br=broadened. If coupling constant is provided, its unit is Hz.

All melting points are not revised.

Example 1

Steps: 0.298 g (2 mmol) of pyridine-2-acrylic acid (compound A) and 10 ml of methanol were added to a reaction flask, 0.03 g (0.3 mmol) of concentrated sulfuric acid was added dropwise to obtain a mixture, then the mixture was reacted at room temperature for 3 hours. Saturated sodium bicarbonate solution was added dropwise, and the mixture's pH was adjusted to about 8, then the mixture was extracted with dichloromethane, the extracted product was dried with anhydrous MgSO$_4$, filtered, concentrated, and dried to obtain 0.223 g of compound I-1, with a yield of 68%. $^1$H NMR (CDCl$_3$): δ 3.82 (s, 3H), 6.95 (d, 1H, J=16.0 Hz), 7.28 (m, 1H), 7.43 (d, 1H, J=8.0 Hz), 7.70 (d, 1H, J=16.0 Hz), 7.73 (m, 1H), 8.66 (d, 1H, J=4.0 Hz); MS (ESI): m/z 164 [M+H]$^+$.

Example 2

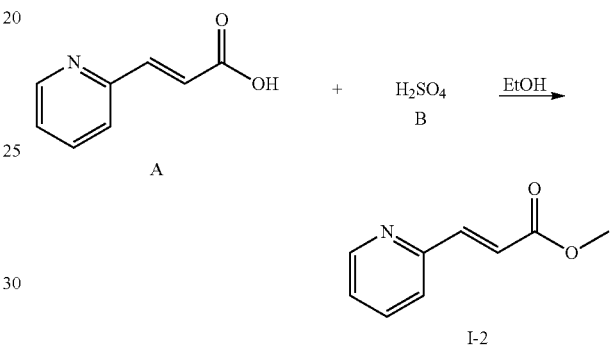

Steps: 0.298 g (2 mmol) of pyridine-2-acrylic acid (compound A) and 10 ml of ethanol were added to a reaction flask, 0.03 g (0.3 mmol) of concentrated sulfuric acid was added dropwise to obtain a mixture, then the mixture was reacted at room temperature for 3 hours. Saturated sodium bicarbonate solution was added dropwise, and the mixture's pH was adjusted to about 8, then the mixture was extracted with dichloromethane, the extracted product was dried with anhydrous MgSO$_4$, filtered, concentrated, and dried to obtain 0.249 g of compound 1-2, with a yield of 72%. $^1$H NMR (CDCl$_3$): δ 1.34 (t, 3H, J=8.0 Hz), 4.28 (q, 2H, J=8.0 Hz), 6.93 (d, 1H, J=16.0 Hz), 7.28 (m, 1H), 7.44 (d, 1H, J=8.0 Hz), 7.69 (d, 1H, J=16.0 Hz), 7.73 (m, 1H), 8.66 (d, 1H, J=4.0 Hz); MS (ESI): m/z 178 [M+H]$^+$.

Example 3

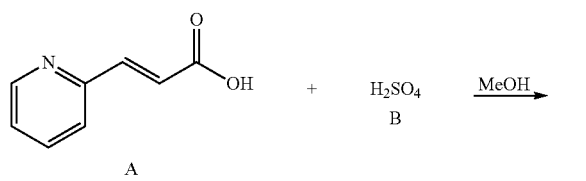

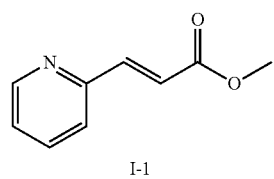

Steps: 0.298 g (2 mmol) of pyridine-3-acrylic acid (compound A) and 10 ml of methanol were added to a reaction flask, 0.03 g (0.3 mmol) of concentrated sulfuric acid was added dropwise to obtain a mixture, then the mixture was reacted at room temperature for 3 hours. Saturated sodium bicarbonate solution was added dropwise, and the mixture's pH was adjusted to about 8, then the mixture was extracted with dichloromethane, the extracted product was dried with anhydrous MgSO$_4$, filtered, concentrated, and dried to obtain 0.233 g of compound I-3, with a yield of 71%. $^1$H NMR (CDCl$_3$): δ 3.75 (s, 3H), 6.44 (d, 1H, J=16.0 Hz), 7.27 (dd, 1H, J=4.0, 8.0 Hz), 7.61 (d, 1H, J=16.0 Hz), 7.77 (d, 1H, J=8.0 Hz), 8.54 (d, 1H, J=4.0 Hz), 8.67 (s, 1H); MS (ESI): m/z 164 [M+H]$^+$.

Example 4

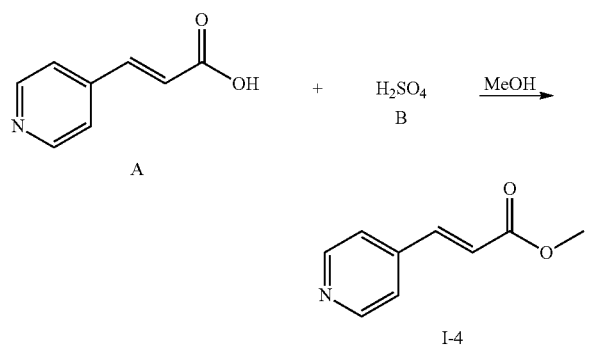

Steps: 0.298 g (2 mmol) of pyridine-4-acrylic acid (compound A) and 10 ml of methanol were added to a reaction flask, 0.03 g (0.3 mmol) of concentrated sulfuric acid was added dropwise to obtain a mixture, then the mixture was reacted at room temperature for 3 hours. Saturated sodium bicarbonate solution was added dropwise, and the mixture's pH was adjusted to about 8, then the mixture was extracted with dichloromethane, the extracted product was dried with anhydrous MgSO$_4$, filtered, concentrated, and dried to obtain 0.235 g of compound I-4, with a yield of 72%. $^1$H NMR (CDCl$_3$): δ 3.72 (s, 3H), 6.51 (d, 1H, J=16.0 Hz), 7.27 (d, 2H, J=4.0 Hz), 7.50 (d, 1H, J=16.0 Hz), 8.56 (d, 2H, J=4.0 Hz); MS (ESI): m/z 164 [M+H]$^+$.

Example 5

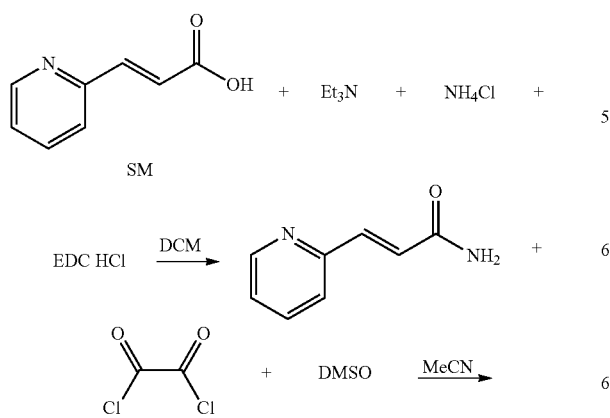

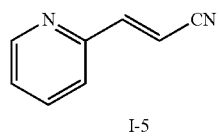

Step 1: 2.0 g (20 mmol) of triethylamine, 1.1 g (20 mmol) of ammonium chloride and 20 ml of dichloromethane were added to a reaction flask with being stirred for 10 minutes, then 1.5 g (10 mmol) of pyridine-2-acrylic acid and 3.8 g (20 mmol) of 1-ethyl-(3-dimethylaminopropyl) carbonyl diimide hydrochloride were added to the reaction mixture, then the mixture was reacted for 12 hours, dilute hydrochloric acid solution was added to adjust the mixture's pH to 3, then the mixture was diluted with water, extracted with dichloromethane, and an aqueous phase was collected, saturated NaOH solution was added to adjust the pH to 8, then the aqueous phase was extracted with dichloromethane, concentrated, dried for reservation.

Step 2: 10 ml of acetonitrile was added to another reaction flask, and cooled to 0° C., the concentrated solution obtained in step 1 was added, then 7.8 mg (0.1 mmol) of dimethyl sulfoxide and 1.5 g (12 mmol) of oxalyl chloride were added, the mixture was reacted for 10 minutes, after heated to 25° C., the solution was reacted for 5 hours, saturated sodium bicarbonate solution was added to adjust the pH to 8, the mixture was diluted with water, then extracted with dichloromethane, concentrated, and separated by column chromatography to obtain 51 mg of compound I-5, with a yield of 4.0%. $^1$H NMR (CDCl$_3$): δ 6.64 (d, 1H, J=16.0 Hz), 7.34-7.44 (m, 3H), 7.78 (t, 1H, J=4.0 Hz), 8.65 (d, 1H, J=4.0 Hz); MS (ESI): m/z 131 [M+H]$^+$.

Example 6

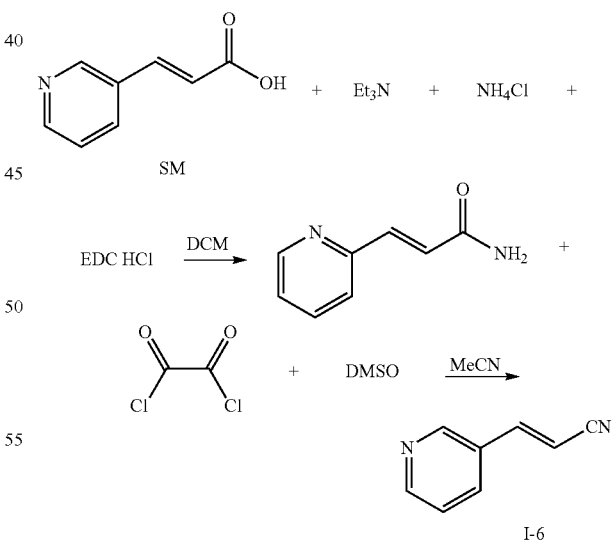

Step 1: 2.0 g (20 mmol) of triethylamine, 1.1 g (20 mmol) of ammonium chloride and 20 ml of dichloromethane were added to a reaction flask with being stirred for 10 minutes, then 1.5 g (10 mmol) of pyridine-3-acrylic acid and 3.8 g (20 mmol) of 1-ethyl-(3-dimethylaminopropyl) carbonyl diimide hydrochloride were added to the reaction mixture, then the mixture was reacted for 12 hours, dilute hydrochloric acid solution was added to adjust the mixture's pH to 3, then the mixture was diluted with water, extracted with dichloromethane, and an aqueous phase was collected, saturated NaOH solution was added to adjust the pH to 8, then the aqueous phase was extracted with dichloromethane, concentrated, dried for reservation.

Step 2: 10 ml of acetonitrile was added to another reaction flask, and cooled to 0° C., the concentrated solution obtained in step 1 was added, then 7.8 mg (0.1 mmol) of dimethyl sulfoxide and 1.5 g (12 mmol) of oxalyl chloride were added, the mixture was reacted for 10 minutes, after heated to 25° C., the solution was reacted for 5 hours, saturated sodium bicarbonate solution was added to adjust the pH to 8, the mixture was diluted with water, then extracted with dichloromethane, concentrated, and separated by column chromatography to obtain 71 mg of compound I-6, with a yield of 5.5%. $^1$H NMR (CDCl$_3$): δ 5.99 (d, 1H, J=16.0 Hz), 7.40 (br s, 1H), 7.42 (d, 1H, J=16.0 Hz), 7.80 (d, 1H, J=8.0 Hz), 8.67 (s, 1H), 8.71 (s, 1H); MS (ESI): m/z 131 [M+H]$^+$.

Example 7

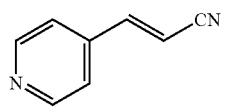

I-7

Compound I-7 was prepared according to the method for preparing the compound 1-6:

Compound I-7: $^1$H NMR (DMSO-d$_6$): δ 6.80 (d, 1H, J=20.0 Hz), 7.63 (d, 2H, J=4.0 Hz), 7.70 (d, 1H, J=16.0 Hz), 8.69 (d, 2H, J=4.0 Hz); MS (ESI): m/z 131 [M+H]$^+$.

Example 8

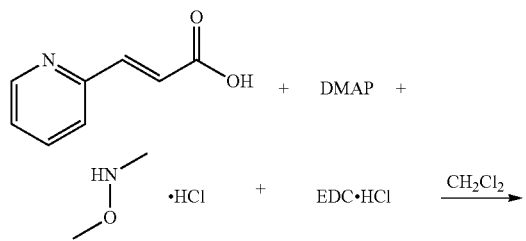

I-8

Steps: 0.489 g (4 mmol) of 4-dimethylaminopyridine, 0.390 g (4 mmol) of dimethylhydroxylamine hydrochloride, 6 ml of dichloromethane were added to a reaction flask to obtain a mixture, the mixture was stirred for 10 minutes, the 0.298 g (2 mmol) of pyridine-2-acrylic acid and 0.767 g (4 mmol) of 1-ethyl-(3-dimethylaminopropyl) carbonyl diimide hydrochloride were added to the mixture, the mixture was reacted for 12 hours, saturated sodium bicarbonate solution was added to adjust the pH to 8, the mixture was diluted with water, then extracted with dichloromethane, the extracted product was dried with anhydrous MgSO$_4$, filtered, concentrated, and separated by column chromatography to obtain 227 mg of compound I-8 with a yield of 59%. $^1$H NMR (CDCl$_3$): δ 3.24 (s, 3H), 3.71 (s, 3H), 7.18 (dd, 1H, J=4.0, 8.0 Hz), 7.33 (d, 1H, J=8.0 Hz), 7.49 (d, 1H, J=16.0 Hz), 7.62-7.65 (m, 2H), 8.58 (d, 1H, J=4.0 Hz); MS (ESI): m/z 193 [M+H]$^+$.

Example 9

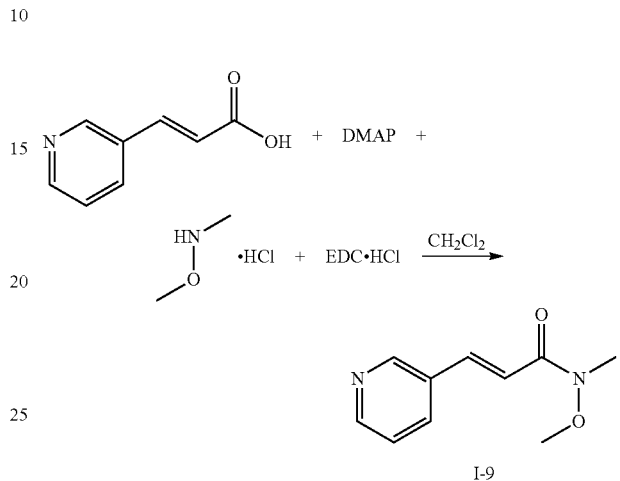

I-9

Steps: 0.489 g (4 mmol) of 4-dimethylaminopyridine, 0.390 g (4 mmol) of dimethylhydroxylamine hydrochloride, 6 ml of dichloromethane were added to a reaction flask to obtain a mixture, the mixture was stirred for 10 minutes, the 0.298 g (2 mmol) of pyridine-3-acrylic acid and 0.767 g (4 mmol) of 1-ethyl-(3-dimethylaminopropyl) carbonyl diimide hydrochloride were added to the mixture, the mixture was reacted for 12 hours, saturated sodium bicarbonate solution was added to adjust the pH to 8, the mixture was diluted with water, then extracted with dichloromethane, the extracted product was dried with anhydrous MgSO$_4$, filtered, concentrated, and separated by column chromatography to obtain 226 mg of compound 1-9 with a yield of 59%. $^1$H NMR (CDCl$_3$): δ 3.31 (s, 3H), 3.77 (s, 3H), 7.10 (d, 1H, J=16.0 Hz), 7.32 (dd, 1H, J=4.0, 8.0 Hz), 7.71 (d, 1H, J=16.0 Hz), 7.86 (d, 1H, J=8.0 Hz), 8.58 (d, 1H, J=4.0 Hz), 8.79 (s, 1H); MS (ESI): m/z 193 [M+H]$^+$.

Example 10

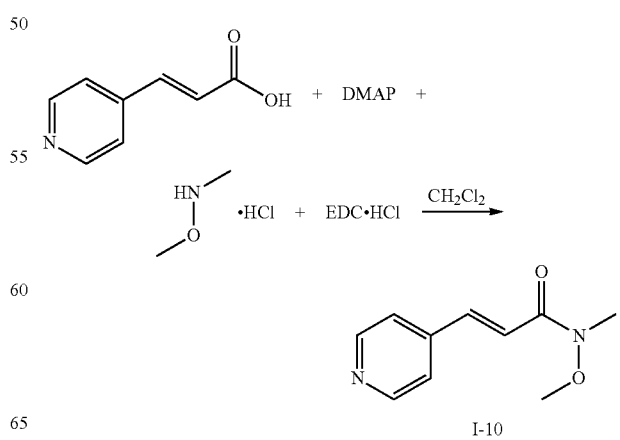

I-10

Steps: 0.489 g (4 mmol) of 4-dimethylaminopyridine, 0.390 g (4 mmol) of dimethylhydroxylamine hydrochloride, 6 ml of dichloromethane were added to a reaction flask to obtain a mixture, the mixture was stirred for 10 minutes, then 0.298 g (2 mmol) of pyridine-4-acrylic acid and 0.767 g (4 mmol) of 1-ethyl-(3-dimethylaminopropyl) carbonyl diimide hydrochloride were added to the mixture, the mixture was reacted for 12 hours, saturated sodium bicarbonate solution was added to adjust the pH to 8, the mixture was diluted with water, then extracted with dichloromethane, the extracted product was dried with anhydrous MgSO$_4$, filtered, concentrated, and separated by column chromatography to obtain 226 mg of compound I-10 with a yield of 59%. $^1$H NMR (CDCl$_3$): δ 3.31 (s, 3H), 3.78 (s, 3H), 7.20 (d, 1H, J=16.0 Hz), 7.42 (br s, 2H), 7.65 (d, 1H, J=16.0 Hz), 8.66 (br s, 2H); MS (ESI): m/z 193 [M+H]$^+$.

Example 11

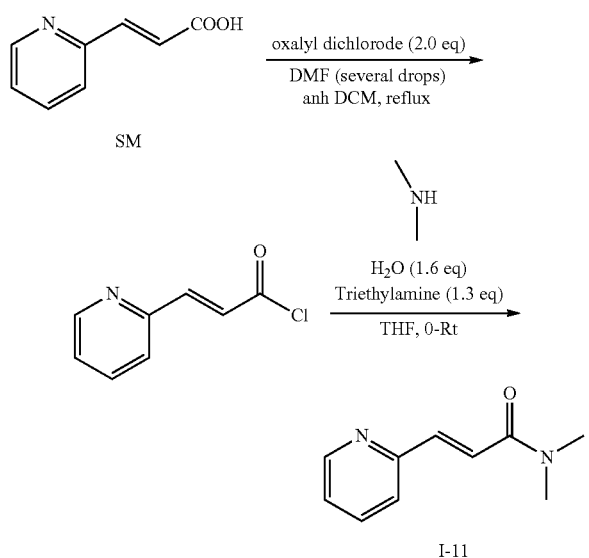

Step 1: 0.75 g (5 mmol) of pyridine-2-acrylic acid and 5 ml of dichloromethane were added to a reaction flask to obtain a mixture, the mixture was cooled to 0° C., several drops of N, N-dimethylformamide was added, and then 1.3 g (10 mmol) of oxalyl chloride was added slowly, the mixture was reacted for 15 minutes, after heated to 25° C., the mixture was reacted for 6 hours, concentrated for reservation.

Step 2: 5 ml of tetrahydrofuran was added to another reaction flask, and cooled to 0° C., the concentrated solution obtained in step 1 was added, then 0.668 g (6.6 mmol) of triethylamine and 0.902 g (8 mmol) of dimethylamine aqueous solution were added to the mixture, the mixture was reacted for 15 minutes, after heated to 25° C., the mixture was reacted for 6 hours, saturated sodium bicarbonate solution was added to adjust the pH to 8, the mixture was then extracted with dichloromethane, the extracted product was dried with anhydrous MgSO$_4$, concentrated, and separated by column chromatography to obtain 244 mg of compound I-11, with a yield of 28%. $^1$H NMR (CDCl$_3$): δ 3.08 (s, 3H), 3.23 (s, 3H), 7.27 (dd, 1H, J=4.0, 8.0 Hz), 7.38 (d, 1H, J=8.0 Hz), 7.58 (d, 1H, J=16.0 Hz), 7.64 (d, 1H, J=16.0 Hz), 7.73 (t, 1H, J=8.0 Hz), 8.64 (d, 1H, J=4.0 Hz); MS (ESI): m/z 177 [M+H]$^+$.

Example 12

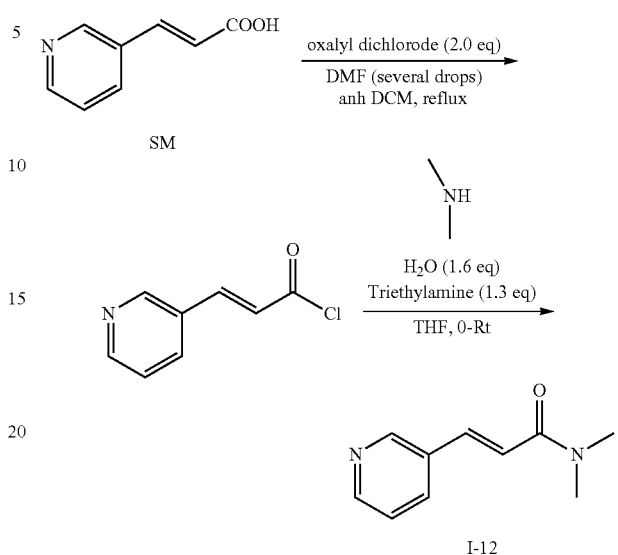

Step 1: 0.75 g (5 mmol) of pyridine-3-acrylic acid and 5 ml of dichloromethane were added to a reaction flask to obtain a mixture, the mixture was cooled to 0° C., several drops of N, N-dimethylformamide was added, and then 1.3 g (10 mmol) of oxalyl chloride was added slowly, the mixture was reacted for 15 minutes, after heated to 25° C., the mixture was reacted for 6 hours, concentrated for reservation.

Step 2: 5 ml of tetrahydrofuran was added to another reaction flask, and cooled to 0° C., the concentrated solution obtained in step 1 was added, then 0.668 g (6.6 mmol) of triethylamine and 0.902 g (8 mmol) of dimethylamine aqueous solution were added, the mixture was reacted for 15 minutes, after heated to 25° C., the mixture was reacted for 6 hours, saturated sodium bicarbonate solution was added to adjust the pH to 8, the mixture was then extracted with dichloromethane, the extracted product was dried with anhydrous MgSO$_4$, concentrated, and separated by column chromatography to obtain 222 mg of compound 1-12, with a yield of 25%. $^1$H NMR (CDCl$_3$): δ 3.10 (s, 3H), 3.22 (s, 3H), 6.99 (d, 1H, J=16.0 Hz), 7.35 (dd, 1H, J=4.0, 8.0 Hz), 7.66 (d, 1H, J=16.0 Hz), 7.85 (d, 1H, J=8.0 Hz), 8.59 (d, 1H, J=4.0 Hz), 8.79 (s, 1H); MS (ESI): m/z 177 [M+H]$^+$.

Example 13

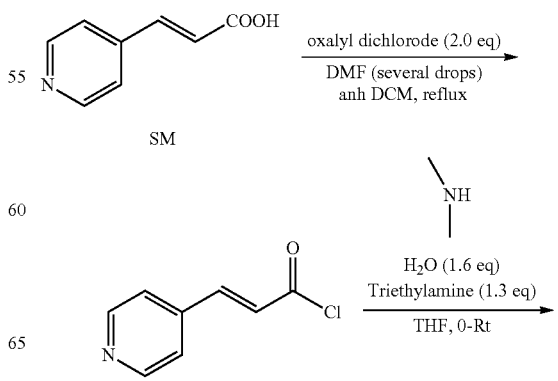

-continued

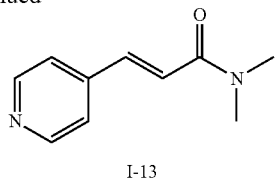

I-13

Step 1: 0.75 g (5 mmol) of pyridine-4-acrylic acid and 5 ml of dichloromethane were added to a reaction flask to obtain a mixture, the mixture was cooled to 0° C., several drops of N, N-dimethylformamide was added, and then 1.3 g (10 mmol) of oxalyl chloride was added slowly, the mixture was reacted for 15 minutes, after heated to 25° C., the mixture was reacted for 6 hours, concentrated for reservation.

Step 2: 5 ml of tetrahydrofuran was added to another reaction flask, and cooled to 0° C., the concentrated solution obtained in step 1 was added to the reaction mixture, then 0.668 g (6.6 mmol) of triethylamine and 0.902 g (8 mmol) of dimethylamine aqueous solution were added to the mixture, the mixture was reacted for 15 minutes, after heated to 25° C., the mixture was reacted for 6 hours, saturated sodium bicarbonate solution was added to adjust the pH to 8, the mixture was then extracted with dichloromethane, the extracted product was dried with anhydrous $MgSO_4$, concentrated, and separated by column chromatography to obtain 271 mg of compound I-13, with a yield of 31%. $^1$H NMR ($CDCl_3$): δ 3.09 (s, 3H), 3.20 (s, 3H), 7.10 (d, 1H, J=16.0 Hz), 7.45 (d, 2H, J=8.0 Hz), 7.59 (d, 1H, J=16.0 Hz), 8.65 (d, 2H, J=4.0 Hz); MS (ESI): m/z 177 [M+H]$^+$.

The following compounds were prepared by Wittig Horner reaction

Example 14

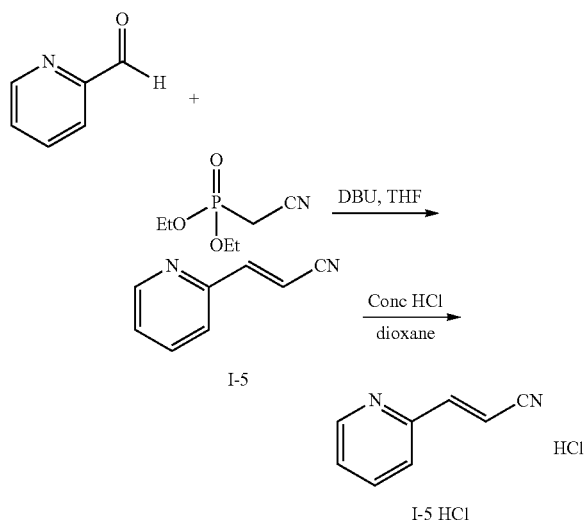

Wittig Horner reagent 2-diethyloxyphosphoryl acetonitrile (19.48 g, 0.11 mol) was dissolved in anhydrous THF (100 mL) at room temperature. The temperature was reduced to 0° C., then DBU (16.75 g, 1.10 mol) was added dropwise under the protection of $N_2$ and stirring, then the mixture was naturally raised to room temperature, the mixture was stirred and reacted for 20 minutes. The reaction mixture was cooled to 0° C. again, and pyridine-2-formaldehyde (10.71 g, 0.10 mol) was added dropwise. The mixture was naturally raised to room temperature, the mixture was stirred and reacted overnight, and LCMS showed that the reaction was complete. After being concentrated, the reaction mixture was added to saturated ammonium chloride aqueous solution, stirred for 30 minutes, and solids were precipitated. The mixture was filtered and solids were washed with a small amount of ice water. The collected light yellow solid (I-5) weighed 11.28 g after drying, and the yield was 86%. The product was recrystallized with ethyl acetate/petroleum ether to obtain a off-white solid. mp is 82.5-83.0° C. The MS and $^1$HNMR spectra of I-5 prepared by Wittig Horner reaction are consistent with those of I-5 prepared by the method in Example 5.

I-5 (1.00 g, 7.7 mmol) was dissolved in dioxane (10 mL) at room temperature, the mixture was cooled to below 10° C., concentrated hydrochloric acid (1 mL) was added slowly under stirring, white solids were precipitated, and the mixture was continued to stir for 30 minutes. Then the mixture was naturally raised to room temperature, and continued to stir for another 30 minutes. The mixture was filtered, a filter cake with washed with ethyl acetate and dried. The obtained I-5 hydrochloride (I-5 HCl) weighed 745 mg and the yield was 58%. mp is 178.6° C. $^1$H NMR (DMSO-$d_6$): δ 6.81 (d, 1H, J=16.4 Hz), 7.56 (ddd, 1H, J=1.2, 4.8, 7.6 Hz), 7.75 (d, 1H, J=7.6 Hz), 7.77 (d, 1H, J=16.4 Hz), 8.02 (td, 1H, J=2.0, 8.0 Hz), 8.70 (d, 1H, J=5.2 Hz), 11.28 (br s, 1H); MS (ES-API): m/z 131 [M+H]$^+$.

Example 15

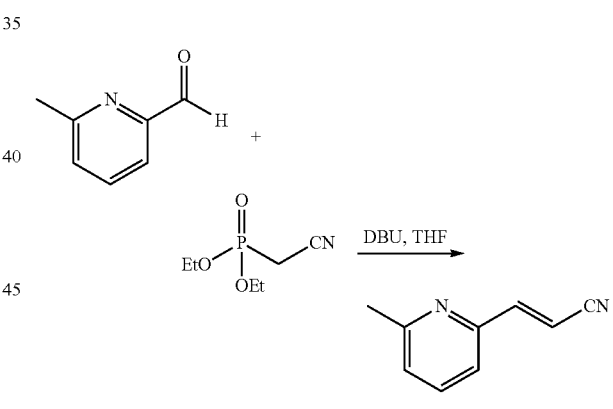

I-14

Wittig Horner reagent 2-diethyloxyphosphoryl acetonitrile (399 mg, 2.25 mmol) was dissolved in anhydrous THF (20 mL) at room temperature and under the protection nitrogen, then DBU (343 mg, 2.25 mmol) was added, the mixture was stirred for 20 minutes, cooled to 0° C., and then 6-methylpyridine-2-formaldehyde (273 mg, 2.25 mmol) was added to the mixture. The mixture was naturally raised to room temperature, stirred overnight, and LCMS showed that the reaction was complete. The reaction mixture was poured into water, stirred for 10 minutes, and then the mixture was extracted with ethyl acetate. The ethyl acetate extract was concentrated, and then a residue was separated with a preparation board (ethyl acetate/petroleum ether=1/5) to obtain 250 mg of white solid (I-14), with yield of 77%. $^1$H NMR ($CDCl_3$): δ 2.57 (s, 3H), 6.61 (d, 1H, J=16.4 Hz), 7.12

(d, 1H, J=7.6 Hz), 7.19 (d, 1H, J=7.6 Hz), 7.37 (d, 1H, J=16.0 Hz), 7.62 (t, 1H, J=8.4 Hz); MS (ES-API): m/z 145 [M+H]⁺.

Example 16

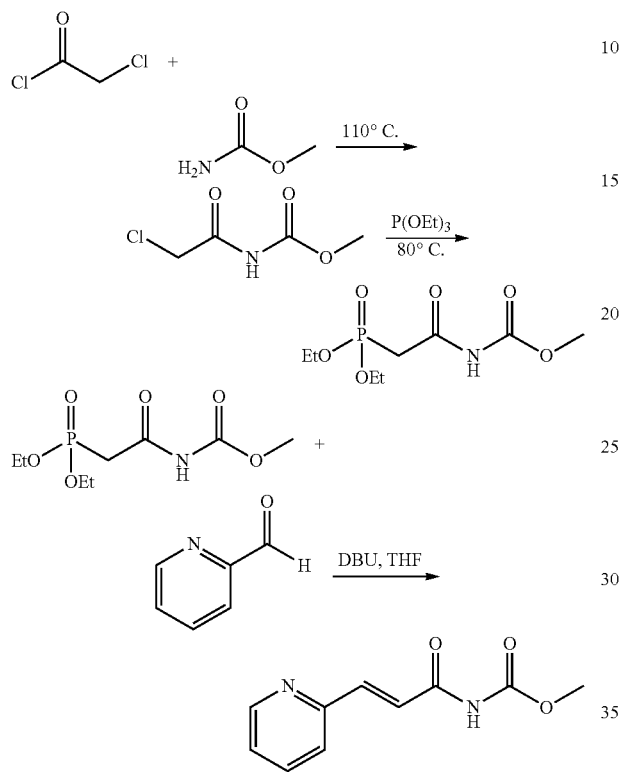

I-15

Methyl carbamate (5.0 g, 66 mmol) and chloroacetyl chloride (5.4 mL, 68 mmol) were added to a reaction flask at room temperature to obtain a reaction mixture, and air in the reaction system was replaced with nitrogen. The reaction mixture was heated to 110° C. and reacted for 30 minutes. The reaction solution was solidified. Hydrogen chloride gas generated in the reaction process was absorbed by sodium hydroxide aqueous solution. After cooling to room temperature, 25 ml of ether was added the reaction flask, the reaction mixture was stirred for 30 minutes, filtered, the filtrate was discarded, and a light yellow solid was collected. The obtained light yellow solid was added to another reaction flask, then triethyl phosphite (22 mL, 0.13 mol) was added to the reaction mixture; the reaction mixture was heated to 80° C. under the protection of nitrogen, and reacted for 24 hours. After the reaction solution was cooled to room temperature, 50 ml of petroleum ether to added to the reaction solution, the solution was stirred for 30 minutes, and let stand at −20° C. overnight, a white solid was precipitated, and the solid was collected. The weight of the white solid after being dried was 15.68 g, and the yield was 94%. The Wittig Horner reagent N-(2-diethoxyphosphoryl acetyl) methyl carbamate obtained was directly used for the next reaction without further purification.

Wittig Horner reagent N-(2-diethoxyphosphoryl acetyl) methyl carbamate (836 mg, 3.30 mmol), anhydrous THF (20 mL) and DBU (502 mg, 3.30 mmol) were added in sequence to a reaction flask at room temperature. Under the protection of nitrogen, the reaction solution was stirred for 20 minutes, then pyridine-2-formaldehyde (321 mg, 3.00 mmol) was added, the solution was stirred overnight, and LCMS showed that the reaction was complete. After being concentrated, the reaction mixture was added to the saturated ammonium chloride aqueous solution, stirred for 30 minutes, and the solid was precipitated. The reaction mixture was filtered, a solid was collected, and dried. Then the obtained solid was added to 20 ml of methyl tert butyl ether, the solution was stirred for 30 minutes, filtered, and the filtrate was discarded. The obtained off-white solid (1-15) weighed 415 mg after drying, and the yield was 67%. ¹H NMR (DMSO-d₆) δ 3.69 (s, 3H), 7.40-7.45 (m, 2H), 7.64-7.68 (m, 2H), 7.88 (td, 1H, J=4.0, 8.0 Hz), 8.65 (dd, 1H, J=4.0, 8.0 Hz), 10.89 (s, 1H); MS (ES-API): m/z 207 [M+H]⁺.

Example 17

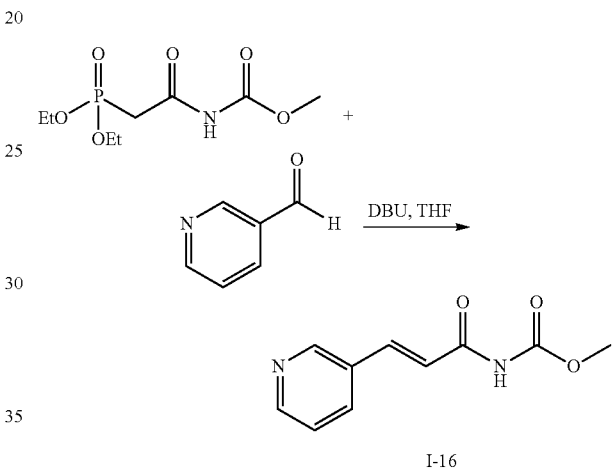

I-16

Wittig Horner reagent N-(2-diethoxyphosphoryl acetyl) methyl carbamate (836 mg, 3.30 mmol), anhydrous THF (20 mL) and DBU (502 mg, 3.30 mmol) were added in sequence to a reaction flask at room temperature. Under the protection of nitrogen, the reaction solution was stirred for 20 minutes, then pyridine-3-formaldehyde (321 mg, 3.00 mmol) was added, the solution was stirred overnight, and LCMS showed that the reaction was complete. After being concentrated, the reaction mixture was added to the saturated ammonium chloride aqueous solution, stirred for 30 minutes, and the solid was precipitated. The reaction mixture was filtered, a solid was collected, and dried. Then the obtained solid was added to 20 ml of methyl tert butyl ether, the solution was stirred for 30 minutes, filtered, and the filtrate was discarded. The obtained light yellow solid (I-16) weighed 475 mg after drying, and the yield was 76%. ¹H NMR (DMSO-d₆) δ 3.70 (s, 3H), 7.11 (d, 1H, J=16.0 Hz), 7.49 (dd, 1H, J=4.0, 8.0 Hz), 7.69 (d, 1H, J=16.0 Hz), 8.03 (m, 1H), 8.61 (m, 1H), 8.81 (br s, 1H), 10.85 (s, 1H); MS (ES-API): m/z 207 [M+H]⁺.

Example 18

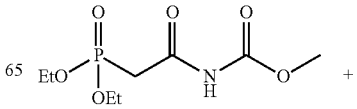

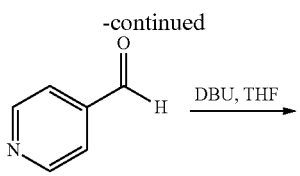

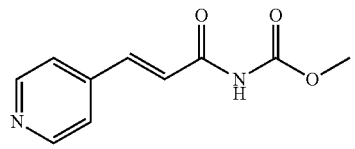

I-17

Wittig Horner reagent N-(2-diethoxyphosphoryl acetyl) methyl carbamate (836 mg, 3.30 mmol), anhydrous THF (20 mL) and DBU (502 mg, 3.30 mmol) were added in sequence to a reaction flask at room temperature. Under the protection of nitrogen, the reaction solution was stirred for 20 minutes, then pyridine-4-formaldehyde (321 mg, 3.00 mmol) was added, the solution was stirred overnight, and LCMS showed that the reaction was complete. After being concentrated, the reaction mixture was added to the saturated ammonium chloride aqueous solution, stirred for 30 minutes, and the solid was precipitated. The reaction mixture was filtered, a solid was collected, and dried. Then the obtained solid was added to 20 ml of methyl tert butyl ether, the solution was stirred for 30 minutes, filtered, and the filtrate was discarded. The obtained off-white solid (I-17) weighed 483 mg after drying, and the yield was 78%. $^1$H NMR (DMSO-d$_6$) δ 3.70 (s, 3H), 7.20 (d, 1H, J=16.0 Hz), 7.57 (d, 2H, J=4.0 Hz), 7.61 (d, 1H, J=16.0 Hz), 8.66 (d, 2H, J=4.0 Hz), 10.92 (s, 1H); MS (ES-API): m/z 207 [M+H]$^+$.

Example 19

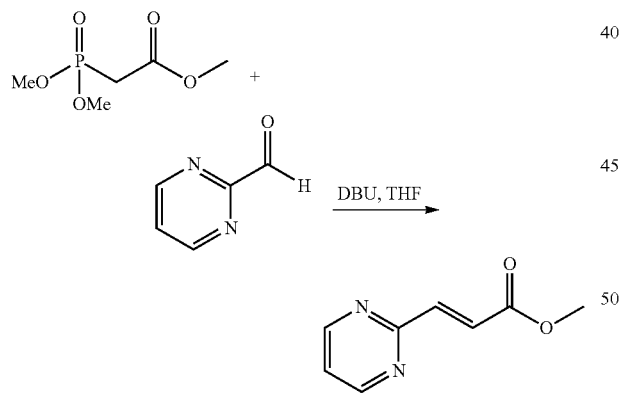

I-18

Wittig Horner reagent methyl 2-dimethoxyphosphoacetate (601 mg, 3.30 mmol) anhydrous THF (20 mL) and DBU (502 mg, 3.30 mmol) were added in sequence to a reaction flask at room temperature. Under the protection of nitrogen, the reaction solution was stirred for 20 minutes, then pyridine-2-formaldehyde (324 mg, 3.00 mmol) was added, the solution was stirred overnight, and LCMS showed that the reaction was complete. After being concentrated, the reaction mixture was added to the saturated ammonium chloride aqueous solution, stirred for 30 minutes, and then extracted with ethyl acetate. The ethyl acetate extract was concentrated, and then residue was separated by silica gel chromatography (ethyl acetate/petroleum ether=1/20 to 1/4) to obtain 325 mg of off-while solid (1-18), with yield of 66%. $^1$H NMR (DMSO-d$_6$): δ 3.78 (s, 3H), 7.07 (d, 1H, J=16.0 Hz), 7.45-7.57 (m, 2H), 8.91 (d, 2H, J=8.0 Hz); MS (ES-API): m/z 165 [M+H]$^+$.

Example 20

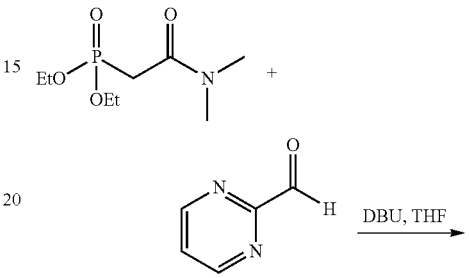

I-19

Wittig Homer reagent 2-diethyloxyphosphoryl-N, N-dimethylacetamide (737 mg, 3.30 mmol), anhydrous THF (20 mL) and DBU (502 mg, 3.30 mmol) were added in sequence to a reaction flask at room temperature. Under the protection of nitrogen, the reaction solution was stirred for 20 minutes, then pyridine-2-formaldehyde (324 mg, 3.00 mmol) was added, the solution was stirred overnight, and LCMS showed that the reaction was complete. After being concentrated, the reaction mixture was added to the saturated ammonium chloride aqueous solution, stirred for 30 minutes, and then extracted with ethyl acetate. The ethyl acetate extract was concentrated, and then residue was separated by silica gel chromatography (ethyl acetate/petroleum ether=1/10 to 1/1) to obtain 225 mg of off-while solid (I-19), with yield of 42%. $^1$H NMR (DMSO-d$_6$): δ 2.95 (s, 3H), 3.14 (s, 3H), 7.33 (d, 1H, J=16.0 Hz), 7.46 (t, 1H, J=4.0 Hz), 7.71 (d, 1H, J=16.0 Hz), 8.87 (d, 2H, J=4.0 Hz); MS (ES-API): m/z 178 [M+H]$^+$.

Example 21

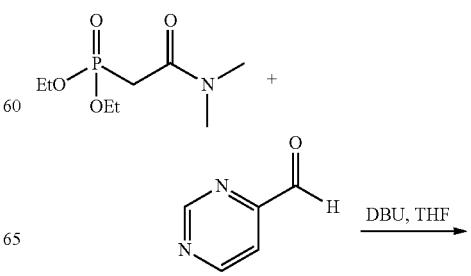

-continued

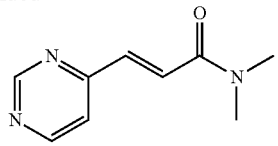

I-20

Wittig Homer reagent 2-diethyloxyphosphoryl-N, N-dimethylacetamide (737 mg, 3.30 mmol), anhydrous THF (20 mL) and DBU (502 mg, 3.30 mmol) were added in sequence to a reaction flask at room temperature. Under the protection of nitrogen, the reaction solution was stirred for 20 minutes, then pyridine-4-formaldehyde (324 mg, 3.00 mmol) was added, the solution was stirred overnight, and LCMS showed that the reaction was complete. After being concentrated, the reaction mixture was added to the saturated ammonium chloride aqueous solution, stirred for 30 minutes, and then extracted with ethyl acetate. The ethyl acetate extract was concentrated, and then residue was separated by silica gel chromatography (ethyl acetate/petroleum ether=1/10 to 1/1) to obtain 166 mg of off-while solid (I-20), with yield of 31%. $^1$H NMR (DMSO-$d_6$): δ 2.96 (s, 3H), 3.16 (s, 3H), 7.41 (d, 1H, J=15.2 Hz), 7.75 (d, 1H, J=15.2 Hz), 7.84 (dd, 1H, J=1.6, 5.2 Hz), 8.88 (d, 1H, J=5.2 Hz), 9.21 (d, 1H, J=1.2 Hz); MS (ES-API): m/z 178 [M+H]$^+$.

Example 22

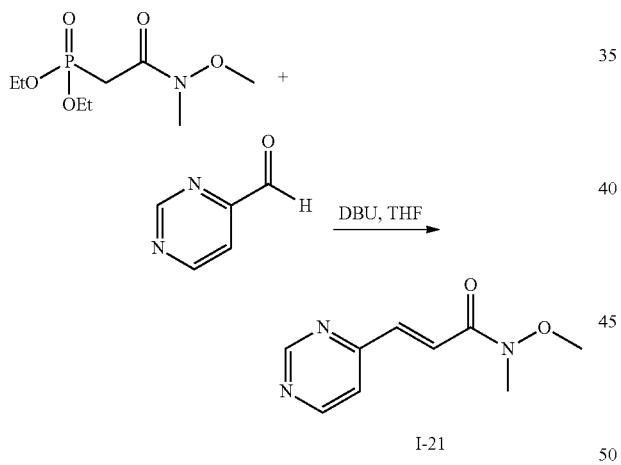

I-21

Wittig Horner reagent 2-diethoxyphosphoryl-N-methoxy-N-methylacetamide (789 mg, 3.30 mmol), anhydrous THF (20 mL) and DBU (502 mg, 3.30 mmol) were added in sequence to a reaction flask at room temperature. Under the protection of nitrogen, the reaction solution was stirred for 20 minutes, then pyridine-4-formaldehyde (324 mg, 3.00 mmol) was added, the solution was stirred overnight, and LCMS showed that the reaction was complete. After being concentrated, the reaction mixture was added to the saturated ammonium chloride aqueous solution, stirred for 30 minutes, and then extracted with ethyl acetate. The ethyl acetate extract was concentrated, and then residue was separated by silica gel chromatography (ethyl acetate/petroleum ether=1/10 to 1/1) to obtain 277 mg of off-while solid (1-21), with yield of 48%. $^1$H NMR (DMSO-$d_6$): δ 3.24 (s, 3H), 3.77 (s, 3H), 7.54 (d, 1H, J=15.6 Hz), 7.69 (d, 1H, J=15.6 Hz), 7.82 (dd, 1H, J=1.6, 5.2 Hz), 8.90 (d, 1H, J=5.2 Hz), 9.23 (d, 1H, J=1.6 Hz); MS (ES-API): m/z 194 [M+H]$^+$.

Example 23

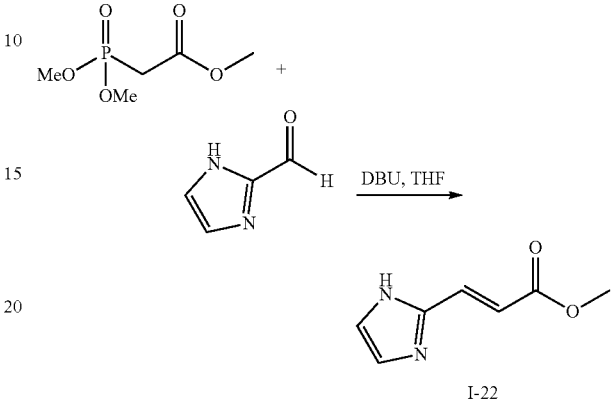

I-22

Wittig Homer reagent methyl 2-dimethoxyphosphoacetate (601 mg, 3.30 mmol), anhydrous THF (20 mL) and DBU (502 mg, 3.30 mmol) were added in sequence to a reaction flask at room temperature. Under the protection of nitrogen, the reaction solution was stirred for 20 minutes, then 1H-imidazol-2-formaldehyde (288 mg, 3.00 mmol) was added, the solution was stirred overnight, and LCMS showed that the reaction was complete. After being concentrated, the reaction mixture was added to the saturated ammonium chloride aqueous solution, stirred for 30 minutes, and then extracted with ethyl acetate. The ethyl acetate extract was concentrated, and then residue was separated by silica gel chromatography (ethyl acetate/petroleum ether=1/10 to 1/2) to obtain 335 mg of off-while solid (1-22), with yield of 73%. $^1$H NMR (DMSO-$d_6$) δ 3.72 (s, 3H), 6.56 (d, 1H, J=16.0 Hz), 7.24 (br s, 2H), 7.40 (d, 1H, J=16.0 Hz), 12.73 (br s, 1H); MS (ES-API): m/z 153 [M+H]$^+$.

Example 24

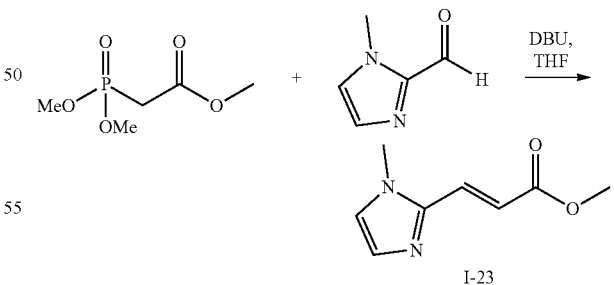

I-23

Wittig Homer reagent methyl 2-dimethoxyphosphoacetate (601 mg, 3.30 mmol), anhydrous THF (20 mL) and DBU (502 mg, 3.30 mmol) were added in sequence to a reaction flask at room temperature. Under the protection of nitrogen, the reaction solution was stirred for 20 minutes, then 1-methylimidazole-2-formaldehyde (330 mg, 3.00 mmol) was added, the solution was stirred overnight, and LCMS showed that the reaction was complete. After being concentrated, the reaction mixture was added to the saturated ammonium chloride aqueous solution, stirred for 30 minutes, and then extracted with ethyl acetate. The ethyl acetate extract was concentrated, and then residue was separated by silica gel chromatography (ethyl acetate/petroleum ether=1/10 to 1/2) to obtain 383 mg of off-while solid (1-23), with yield of 77%. ¹H NMR (DMSO-d₆) δ 3.73 (s, 3H), 3.77 (s, 3H), 6.57 (d, 1H, J=16.0 Hz), 7.07 (s, 1H), 7.35 (s, 1H), 7.54 (d, 1H, J=16.0 Hz); MS (ES-API): m/z 167 [M+H]⁺.

Example 25

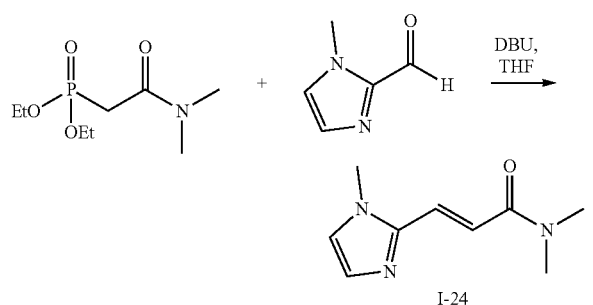

I-24

Wittig Homer reagent 2-diethyloxyphosphoryl-N, N-dimethylacetamide (737 mg, 3.30 mmol), anhydrous THF (20 mL) and DBU (502 mg, 3.30 mmol) were added in sequence to a reaction flask at room temperature. Under the protection of nitrogen, the reaction solution was stirred for 20 minutes, then 1-methylimidazole-2-formaldehyde (330 mg, 3.00 mmol) was added, the solution was stirred overnight, and LCMS showed that the reaction was complete. After being concentrated, the reaction mixture was added to the saturated ammonium chloride aqueous solution, stirred for 30 minutes, and then extracted with ethyl acetate. The ethyl acetate extract was concentrated, and then residue was separated by silica gel chromatography (methanol/dichloromethane=1/100 to 1/30) to obtain 176 mg of off-while solid (I-24), with yield of 33%. ¹H NMR (DMSO-d₆): δ 2.97 (s, 3H), 3.21 (s, 3H), 3.93 (s, 3H), 7.39 (d, 1H, J=15.6 Hz), 7.79 (s, 2H), 8.10 (m, 1H); MS (ES-API): m/z 180 [M+H]⁺.

Example 26

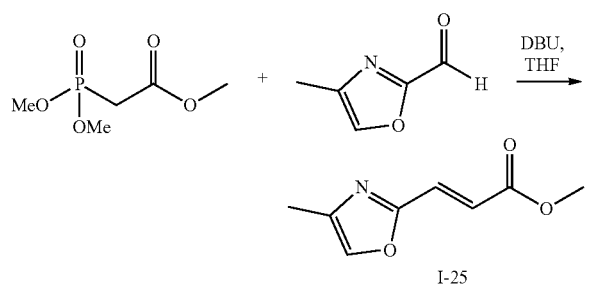

I-25

Wittig Horner reagent methyl 2-dimethoxyphosphoroacetate (410 mg, 2.25 mmol) was dissolved in anhydrous THF (20 mL) at room temperature under the protection of nitrogen, then DBU (343 mg, 2.25 mmol) was added, the mixture was stirred for 20 minutes, cooled to 0° C., and then 4-methyloxazol-2-formaldehyde (250 mg, 2.25 mmol) was added to the mixture. The mixture was naturally raised to room temperature, stirred overnight, and LCMS showed that the reaction was complete. The reaction mixture was poured into water, stirred for 10 minutes, and then the mixture was extracted with ethyl acetate. The ethyl acetate extract was concentrated, and then a residue was separated with a preparation board (ethyl acetate/petroleum ether=1/5) to obtain 235 mg of white solid (1-25), with yield of 62%. ¹H NMR (DMSO-d₆): δ 2.14 (d, 3H, J=1.6 Hz), 3.76 (s, 3H), 6.66 (d, 1H, J=16.0 Hz), 7.30 (d, 1H, J=16.0 Hz), 7.99 (d, 1H, J=1.6 Hz); MS (ES-API): m/z 168 [M+H]⁺.

Example 27

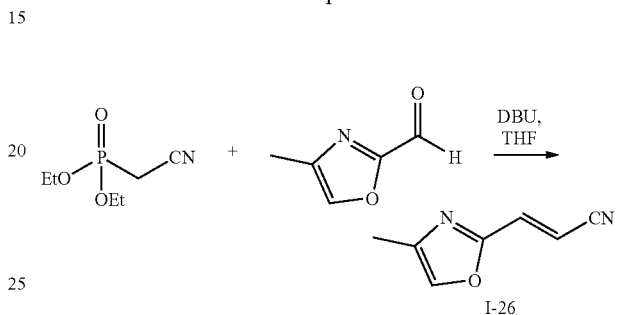

I-26

Wittig Homer reagent 2-diethyloxyphosphoryl acetonitrile (399 mg, 2.25 mmol) was dissolved in anhydrous THF (20 mL) at room temperature under the protection of nitrogen, then DBU (343 mg, 2.25 mmol) was added, the mixture was stirred for 20 minutes, cooled to 0° C., and then 4-methyloxazol-2-formaldehyde (250 mg, 2.25 mmol) was added to the mixture. The mixture was naturally raised to room temperature, stirred overnight, and LCMS showed that the reaction was complete. The reaction mixture was poured into water, stirred for 10 minutes, and then the mixture was extracted with ethyl acetate. The ethyl acetate extract was concentrated, and then a residue was separated with a preparation board (ethyl acetate/petroleum ether=1/5) to obtain 117 mg of white solid (I-26), with yield of 39%. ¹H NMR (DMSO-d₆): δ 2.14 (d, 3H, J=1.2 Hz), 6.56 (d, 1H, J=16.8 Hz), 7.55 (d, 1H, J=16.4 Hz), 8.01 (d, 1H, J=1.6 Hz); MS (ES-API); m/z 135 [M+H]⁺.

Example 28

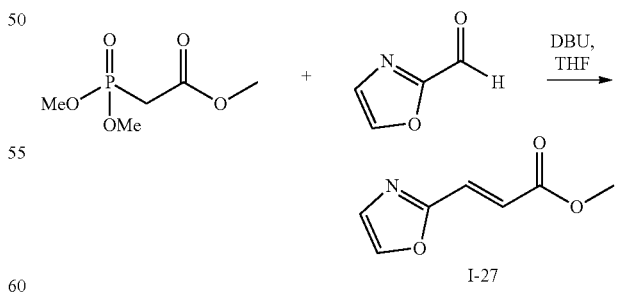

I-27

Wittig Horner reagent methyl 2-dimethoxyphosphoroacetate (401 mg, 2.20 mmol) was dissolved in anhydrous THE (20 mL) at room temperature under the protection of nitrogen, then DBU (335 mg, 2.20 mmol) was added, the mixture was stirred for 20 minutes, cooled to 0° C., and then oxazol-2-formaldehyde (214 mg, 2.20 mmol) was added to the mixture. The mixture was naturally raised to room temperature, stirred overnight, and LCMS showed that the reaction was complete. The reaction mixture was concentrated, and added to saturated ammonium chloride aqueous solution, stirred for 30 minutes, and then the mixture was extracted with ethyl acetate. The ethyl acetate extract was concentrated, and then a residue was separated with a preparation board (ethyl acetate/petroleum ether=1/2) to obtain 85 mg of white solid (1-27), with yield of 25%. $^1$H NMR (DMSO-d$_6$): δ 3.76 (s, 3H), 6.72 (d, 1H, J=16.0 Hz,), 7.37 (d, 1H, J=16.0 Hz), 7.48 (d, 1H, J=0.8 Hz), 8.30 (d, 1H, J=0.8 Hz); MS (ESI): m/z 154 [M+H]$^+$.

Example 29

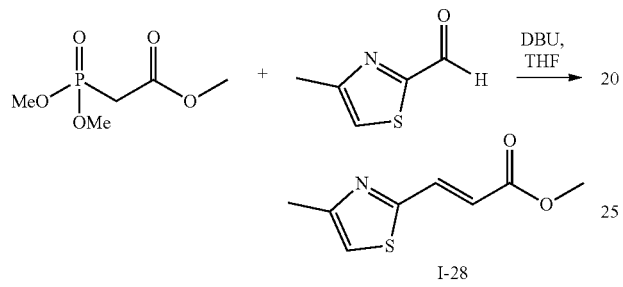

Wittig Horner reagent methyl 2-dimethoxyphosphoroacetate (401 mg, 2.20 mmol) was dissolved in anhydrous THE (20 mL) at room temperature under the protection of nitrogen, then DBU (335 mg, 2.20 mmol) was added, the mixture was stirred for 20 minutes, cooled to 0° C., and then 4-methylthiazol-2-formaldehyde (280 mg, 2.20 mmol) was added to the mixture. The mixture was naturally raised to room temperature, stirred overnight, and LCMS showed that the reaction was complete. The reaction mixture was concentrated, and added to saturated ammonium chloride aqueous solution, stirred for 30 minutes, and then the mixture was extracted with ethyl acetate. The ethyl acetate extract was concentrated, and then a residue was separated with a preparation board (ethyl acetate/petroleum ether=1/2) to obtain 298 mg of white solid (1-28), with yield of 74%. $^1$HNMR (DMSO-d$_6$): δ 2.41 (d, 3H, J=1.2 Hz), 3.74 (s, 3H), 6.69 (d, 1H, J=15.6 Hz), 7.52 (m, 1H), 7.69 (dd, 1H, J=0.4, 16.0 Hz); MS (ESI): m/z 184 [M+H]$^+$.

Example 30

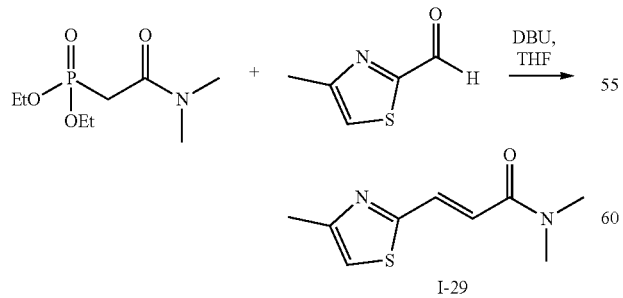

Wittig Horner reagent 2-diethyloxyphosphoryl-N, N-dimethylacetamide (491 mg, 2.20 mmol) was dissolved in anhydrous THF (20 mL) at room temperature under the protection of nitrogen, then DBU (335 mg, 2.20 mmol) was added, the mixture was stirred for 20 minutes, cooled to 0° C., and then 4-methylthiazol-2-formaldehyde (280 mg, 2.20 mmol) was added to the mixture. The mixture was naturally raised to room temperature, stirred overnight, and LCMS showed that the reaction was complete. The reaction mixture was concentrated, and added to saturated ammonium chloride aqueous solution, stirred for 30 minutes, and then the mixture was extracted with ethyl acetate. The ethyl acetate extract was concentrated, and then a residue was separated with a preparation board (ethyl acetate/petroleum ether=1/2) to obtain 88 mg of white solid (I-29), with yield of 30%. $^1$H NMR (DMSO-d$_6$): δ 2.40 (d, 3H, J=0.8 Hz), 2.93 (s, 3H), 3.13 (s, 3H), 7.29 (d, 1H, J=15.2 Hz), 7.42 (s, 1H), 7.48 (d, 1H, J=15.2 Hz); MS (ESI): m/z 197 [M+H]$^+$.

Example 31

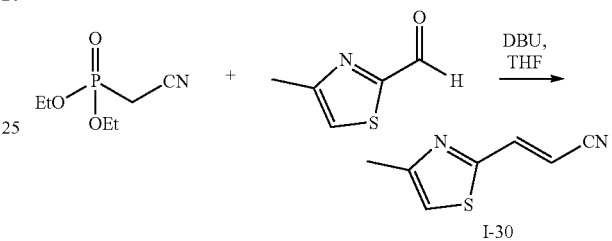

Wittig Horner reagent 2-diethyloxyphosphoryl acetonitrile (390 mg, 2.20 mmol) was dissolved in anhydrous THF (20 mL) at room temperature under the protection of nitrogen, then DBU (335 mg, 2.20 mmol) was added, the mixture was stirred for 20 minutes, cooled to 0° C., and then 4-methylthiazol-2-formaldehyde (280 mg, 2.20 mmol) was added to the mixture. The mixture was naturally raised to room temperature, stirred overnight, and LCMS showed that the reaction was complete. The reaction mixture was concentrated, and added to saturated ammonium chloride aqueous solution, stirred for 30 minutes, and then the mixture was extracted with ethyl acetate. The ethyl acetate extract was concentrated, and then a residue was separated with a preparation board (ethyl acetate/petroleum ether=1/1) to obtain 147 mg of colorless oil (1-30), with yield of 43%. $^1$H NMR (DMSO-d$_6$): δ 2.41 (d, 3H, J=0.8 Hz), 6.56 (d, 1H, J=16.4 Hz), 7.57 (d, 1H, J=1.2 Hz), 7.83 (d, 1H, J 16.4 Hz); MS (ESI): m/z 151 [M+H]$^+$.

Example 32

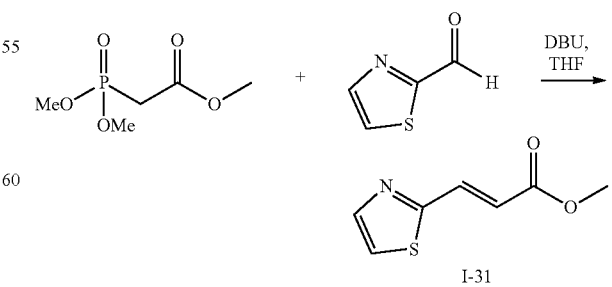

Wittig Horner reagent methyl 2-dimethoxyphosphoroacetate (401 mg, 2.20 mmol) was dissolved in anhydrous THE (20 mL) at room temperature under the protection of nitrogen, then DBU (335 mg, 2.20 mmol) was added, the mixture was stirred for 20 minutes, cooled to 0° C., and then thiazol-2-formaldehyde (249 mg, 2.20 mmol) was added to the mixture. The mixture was naturally raised to room temperature, stirred overnight, and LCMS showed that the reaction was complete. The reaction mixture was concentrated, and added to saturated ammonium chloride aqueous solution, stirred for 30 minutes, and then the mixture was extracted with ethyl acetate. The ethyl acetate extract was concentrated, and then a residue was separated with a preparation board (ethyl acetate/petroleum ether=1/2) to obtain 267 mg of white solid (I-31), with yield of 81%. $^1$H NMR (DMSO-d$_6$): δ 3.75 (s, 3H), 6.76 (d, 1H, J=16.0 Hz), 7.78 (d, 1H, J=16.0 Hz), 7.96 (d, 1H, J=3.2 Hz), 8.02 (d, 1H, J=3.2 Hz); MS(ESI): m/z 170 [M+H]$^+$.

Example 33

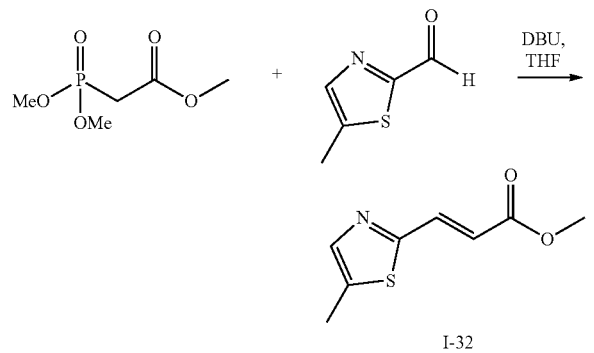

Wittig Horner reagent methyl 2-dimethoxyphosphoroacetate (401 mg, 2.20 mmol) was dissolved in anhydrous THE (20 mL) at room temperature under the protection of nitrogen, then DBU (335 mg, 2.20 mmol) was added, the mixture was stirred for 20 minutes, cooled to 0° C., and then 5-methylthiazol-2-formaldehyde (280 mg, 2.20 mmol) was added to the mixture. The mixture was naturally raised to room temperature, stirred overnight, and LCMS showed that the reaction was complete. The reaction mixture was concentrated, and added to saturated ammonium chloride aqueous solution, stirred for 30 minutes, and then the mixture was extracted with ethyl acetate. The ethyl acetate extract was concentrated, and then a residue was separated with a preparation board (ethyl acetate/petroleum ether=1/2) to obtain 309 mg of white solid (I-32), with yield of 77%. $^1$H NMR (CDCl$_3$): δ 2.52 (d, 3H, J=1.2 Hz), 3.81 (s, 3H), 6.59 (d, 1H, J=15.6 Hz), 7.57 (d, 1H, J=1.2 Hz), 7.70 (d, 1H, J=16.0 Hz); MS (ESI): m/z 184 [M+H]$^+$.

Example 34

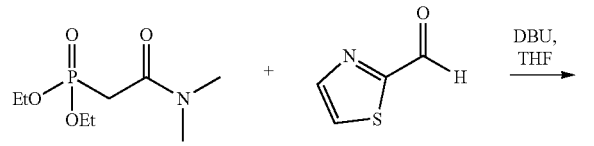

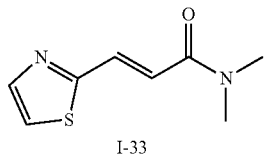

Wittig Homer reagent 2-diethyloxyphosphoryl-N, N-dimethylacetamide (491 mg, 2.20 mmol) was dissolved in anhydrous THF (20 mL) at room temperature under the protection of nitrogen, then DBU (335 mg, 2.20 mmol) was added, the mixture was stirred for 20 minutes, cooled to 0° C., and then thiazole-2-formaldehyde (249 mg, 2.20 mmol) was added to the mixture. The mixture was naturally raised to room temperature, stirred overnight, and LCMS showed that the reaction was complete. The reaction mixture was concentrated, and added to saturated ammonium chloride aqueous solution, stirred for 30 minutes, and then the mixture was extracted with ethyl acetate. The ethyl acetate extract was concentrated, and then a residue was separated with a preparation board (ethyl acetate/petroleum ether=1/1) to obtain 65 mg of white solid (I-33), with yield of 22%. $^1$H NMR (DMSO-d$_6$): δ 2.94 (s, 3H), 3.14 (s, 3H), 7.35 (d, 1H, J=15.2 Hz), 7.56 (d, 1H, J=15.2 Hz), 7.87 (d, 1H, J=3.2 Hz), 7.95 (d, 1H, J=3.2 Hz); MS (ESI): m/z 183 [M+H]$^+$.

Example 35

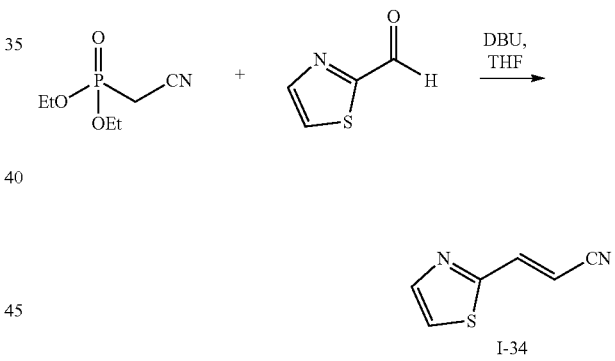

Wittig Homer reagent 2-diethyloxyphosphoryl acetonitrile (390 mg, 2.20 mmol) was dissolved in anhydrous THF (20 mL) at room temperature under the protection of nitrogen, then DBU (335 mg, 2.20 mmol) was added, the mixture was stirred for 20 minutes, cooled to 0° C., and then thiazole-2-formaldehyde (249 mg, 2.20 mmol) was added to the mixture. The mixture was naturally raised to room temperature, stirred overnight, and LCMS showed that the reaction was complete. The reaction mixture was concentrated, and added to saturated ammonium chloride aqueous solution, stirred for 30 minutes, and then the mixture was extracted with ethyl acetate. The ethyl acetate extract was concentrated, and then a residue was separated with a preparation board (ethyl acetate/petroleum ether=1/1) to obtain 83 mg of colorless oil matter (1-34), with yield of 27%. $^1$H NMR (DMSO-d$_6$): δ 6.64 (d, 1H, J=16.4 Hz), 7.92 (d, 1H, J=16.4 Hz), 8.01 (d, 1H, J=3.2 Hz), 8.04 (d, 1H, J=3.2 Hz); MS (ESI): m/z 137 [M+H]$^+$.

Example 36

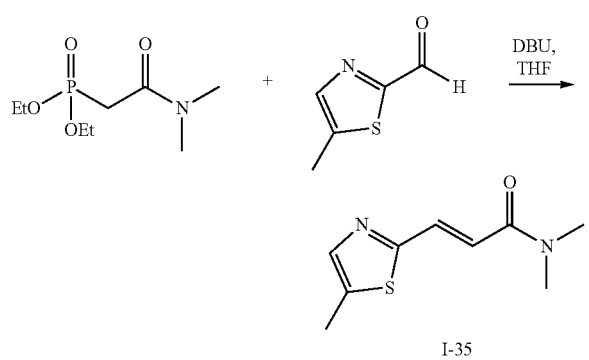

Wittig Homer reagent 2-diethyloxyphosphoryl-N, N-dimethylacetamide (491 mg, 2.20 mmol) was dissolved in anhydrous THF (20 mL) at room temperature under the protection of nitrogen, then DBU (335 mg, 2.20 mmol) was added, the mixture was stirred for 20 minutes, cooled to 0° C., and then 5-methylthiazole-2-formaldehyde (280 mg, 2.20 mmol) was added to the mixture. The mixture was naturally raised to room temperature, stirred overnight, and LCMS showed that the reaction was complete. The reaction mixture was concentrated, and added to saturated ammonium chloride aqueous solution, stirred for 30 minutes, and then the mixture was extracted with ethyl acetate. The ethyl acetate extract was concentrated, and then a residue was separated with a preparation board (ethyl acetate/petroleum ether=1/1) to obtain 90 mg of white solid (I-35), with yield of 28%. $^1$H NMR (CDCl$_3$): δ 2.51 (d, 3H, J=0.8 Hz), 3.07 (s, 3H), 3.18 (s, 3H), 7.19 (d, 1H, J=15.2 Hz), 7.53 (d, 1H, J=1.6 Hz), 7.65 (d, 1H, J=15.2 Hz); MS (ESI): m/z 197 [M+H]$^+$.

Example 37

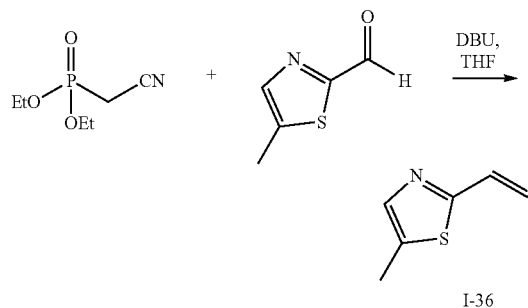

Wittig Homer reagent 2-diethyloxyphosphoryl acetonitrile (390 mg, 2.20 mmol) was dissolved in anhydrous THE (20 mL) at room temperature under the protection of nitrogen, then DBU (335 mg, 2.20 mmol) was added, the mixture was stirred for 20 minutes, cooled to 0° C., and then 5-methylthiazole-2-formaldehyde (280 mg, 2.20 mmol) was added to the mixture. The mixture was naturally raised to room temperature, stirred overnight, and LCMS showed that the reaction was complete. The reaction mixture was concentrated, and added to saturated ammonium chloride aqueous solution, stirred for 30 minutes, and then the mixture was extracted with ethyl acetate. The ethyl acetate extract was concentrated, and then a residue was separated with a preparation board (ethyl acetate/petroleum ether=1/1) to obtain 215 mg of white solid (1-36), with yield of 63%. $^1$H NMR (CDCl$_3$): δ 2.54 (d, 3H, J=1.2 Hz), 6.17 (d, 1H, J=16.0 Hz), 7.40 (d, 1H, J=16.0 Hz), 7.60 (d, 1H, J=0.8 Hz); MS (ESI): m/z 151 [M+H]$^+$.

Example 38: Compound I-5 Activated Nrf2 Signaling Pathway: Induced Nrf2 to Enter the Nucleus and NQO-1 and HO-1 Expression in HT22 Cytoplasm As a transcription factor, Nrf2 needs to enter the nucleus and combine with ARE sequence to play a role in transcriptional activation. Therefore, Nrf2 protein level in the nucleus is an important prerequisite for the activation of Nrf2 signaling pathway. NQO-1 and HO-1 are target genes regulated by Nrf2, and the increase of their protein levels is an important sign of activation of the Nrf2 signaling pathway.

HT-22 cells in logarithmic growth phase were selected, the culture medium was discarded, the cells were digested with 0.25% Trypsin containing EDTA, and cell suspension was made. Cell density was adjusted to 50000/ml with DMEM/F12 medium (containing 10% FBS and 1% double antibody) and it was inoculated to 6-well plate, with 2000 μL/well, the number of cells per well was 100,000, and the cells were cultured in a cell incubator at 37° C. in an atmosphere containing 5% CO$_2$ for 24 hours. Then, the medium of each well was replaced with new 1980 μL DMEM/F12 medium. In control group, 20 μL serum-free DMEM/F12 culture medium was added, while in group 1-5 and positive control DMF group, 20 μL tested compound was added, so that the final concentration of tested compound was 1.25 μM and 0.625 μM, respectively. Each concentration was repeated for 3 wells, and they were cultured again. After 24 hours, the cells were collected, nuclear protein and cytoplasmic protein were extracted, and the level of Nrf2 in the nucleus and the expression of NQO-1 and HO-1 in cytoplasm were detected by Western Blot.

As determined by one-way ANOVA, the incubation of tested compounds had a significant impact on the protein level of Nrf2 in the nucleus [F (4,10)=5.912, p=0.0105]. Through the Dunnett's test, it was found that the protein level of Nrf2 in the nucleus of group I-5 was significantly higher than that of the control group (p<0.05); although DMF group showed an upward trend, there was no statistical difference (FIG. 1B).

In the NQO-1 test, as determined by one-way ANOVA, the incubation of test compounds had a significant impact on the protein level of NQO-1 [F (4, 10)=4.027, p=0.0337]. Through the Dunnett's test, it was found that compared with the control group, the protein level of NQO-1 increased significantly (p<0.05) when the concentration of I-5 group was 1.25 μM; although DMF group showed an upward trend, there was no statistical difference (FIG. 1C). In the HO-1 test, as determined by one-way ANOVA, the incubation of tested compounds had a significant impact on the HO-1 protein level [F (4,10)=6.562, p=0.0074]. Through the Dunnett's test, it was found that compared with the control group, the protein level of HO-1 increased significantly (p<0.05) when the concentration of 1-5 group was 1.25 M and 0.625 μM; although DMF group showed an upward trend, there was no statistical difference (FIG. 1D).

In conclusion, I-5 has the pharmacological effect of activating Nrf2 signaling pathway at a concentration of 1.25 μM and 0.625 μM. Specifically, it introduces Nrf2 to enter the nucleus and improves the level of NQO-1 and HO-1 in the cytoplasm, and its effect is far superior to DMF.

Example 39: Protective Effect of Compounds on HT-22 Cell Damage Caused by L-Glutamate Monosodium Salt Well-proliferated HT-22 cells, derived from mouse hippocampal neuronal cells in logarithmic growth phase, were selected, and they were counted after being subjected to trypsin digestion and dispersion. The cell density was adjusted with DMEM/F12 medium (containing 10% FBS and 1% double antibody). The cells were then inoculated in a 96-well plate at a density of 2,000 cells per well, and cultured in a cell incubator at 37° C. in atmosphere containing 5% $CO_2$ for 24 hours. For the control group and the L-glutamate monosodium salt group (model group), serum-free DMEM/F12 medium was added, and the other wells were added with tested compounds of different concentrations; except that the serum-free DMEM/F12 medium was added to the control group, L-glutamate monosodium salt solution at the final concentration of 15 mM was added to the remaining wells. After 24 hours, the cell viability was detected with a luminescent cell viability assay kit.

The effects of compounds 1-1 to I-13 on the damage of HT-22 cells caused by L-glutamate monosodium salt are shown in Table 1. Experimental results indicated that, on the model of HT22 cell damage caused by the L-glutamate monosodium salt, all the tested compounds can reduce the damage of the L-glutamate monosodium salt to the HT22 cells, in other words, the tested compounds have the effect of protecting nerve cells. In particular, compounds 1-5, 1-8 and 1-13 can better protect cells at low concentrations, and can achieve better effects than the positive control drug DMF (dimethyl fumarate) at high concentrations does.

TABLE 1

Protective effect of compounds on HT-22 cell damage caused by L-glutamate monosodium salt

| Comp. | Conc (μm) | | | | | | | | L-Glu |
|---|---|---|---|---|---|---|---|---|---|
| | 0.078 | 0.156 | 0.313 | 0.625 | 1.25 | 2.5 | 5 | 10 | |
| | Viabiality % | | | | | | | | |
| I-1 | 38.66 | 45.67 | 46.97 | 47.88 | 43.48 | 46.40 | 38.43 | 33.38 | 27.73 |
| I-2 | 46.74 | 48.52 | 48.50 | 48.15 | 48.40 | 46.03 | 39.64 | 34.99 | 27.73 |
| I-3 | 46.77 | 50.62 | 51.59 | 46.82 | 46.20 | 47.54 | 37.16 | 31.24 | 27.73 |
| I-4 | 45.09 | 44.14 | 42.69 | 42.31 | 41.32 | 40.46 | 40.17 | 37.57 | 27.73 |
| I-5 | 65.02 | 79.52 | 79.89 | 73.70 | 65.69 | 57.61 | 58.23 | 52.92 | 32.92 |
| I-6 | 40.07 | 43.31 | 42.94 | 45.84 | 40.91 | 43.02 | 40.13 | 42.61 | 27.73 |
| I-7 | 48.83 | 47.97 | 42.75 | 40.63 | 36.49 | 35.71 | 32.21 | 26.30 | 27.73 |
| I-8 | 62.00 | 77.81 | 70.58 | 71.11 | 54.58 | 54.83 | 50.85 | 52.97 | 27.73 |
| I-9 | 35.49 | 36.76 | 40.83 | 45.85 | 41.63 | 40.13 | 43.42 | 40.07 | 27.73 |
| I-10 | 44.71 | 43.01 | 43.73 | 43.28 | 41.94 | 47.75 | 43.97 | 37.46 | 27.73 |
| I-11 | 42.38 | 42.19 | 46.11 | 44.16 | 45.63 | 46.49 | 35.37 | 40.30 | 27.73 |
| I-12 | 48.94 | 56.10 | 50.79 | 49.51 | 45.57 | 44.16 | 39.26 | 44.34 | 27.73 |
| I-13 | 62.44 | 68.82 | 78.61 | 64.90 | 61.57 | 59.66 | 51.49 | 51.59 | 27.73 |
| DMF | 37.59 | 47.49 | 52.79 | 59.98 | 53.32 | 63.60 | 66.99 | 70.23 | 27.73 |

Example 40: Protective Effect of Compounds on HT-22 Cell Damage Caused by L-Glutamate Monosodium Salt Well-proliferated HT-22 cells, derived from mouse hippocampal neuronal cells in logarithmic growth phase, were selected, and they were counted after being subjected to trypsin digestion and dispersion. The cell density was adjusted with DMEM/F12 medium (containing 10% FBS and 1% double antibody). The cells were then inoculated in a 96-well plate at a density of 2,000 cells per well, and cultured in a cell incubator at 37° C. in atmosphere containing 5% $CO_2$ for 24 hours. For the control group and the L-glutamate monosodium salt group (model group), serum-free DMEM/F12 medium was added, and the other wells were added with tested compounds of different concentrations; except that the serum-free DMEM/F12 medium was added to the control group, L-glutamate monosodium salt solution at the final concentration of 15 mM was added to the remaining wells. After 24 hours, the cell viability was detected with a luminescent cell viability assay kit.

The effects of compounds I-15 to 1-24 on the damage of HT-22 cells caused by L-glutamate monosodium salt are shown in Table 2. Experimental results indicated that, on the model of HT22 cell damage caused by the L-glutamate monosodium salt, all the tested compounds can reduce the damage of the L-glutamate monosodium salt to the HT22 cells, in other words, the tested compounds have the effect of protecting nerve cells. In particular, the effect of the compound I-23 on protecting the cells at low concentrations is equivalent to that of a positive control drug DMF (dimethyl fumarate) at high concentrations.

tions; except that the serum-free DMEM/F12 medium was added to the control group, L-glutamate monosodium salt solution at the final concentration of 15 mM was added to the remaining wells. After 24 hours, the cell viability was detected with a luminescent cell viability assay kit.

TABLE 2

Protective effect of compounds on HT-22 cell damage caused by L-glutamate monosodium salt

| Comp | Conc (μM) | | | | | | | | L-Glu |
|---|---|---|---|---|---|---|---|---|---|
| | 0.078 | 0.156 | 0.313 | 0.625 | 1.25 | 2.5 | 5 | 10 | |
| | Viabiality % | | | | | | | | |
| I-15 | 36.09 | 46.51 | 43.98 | 45.63 | 42.59 | 43.10 | 39.18 | 34.11 | 27.83 |
| I-16 | 41.28 | 51.09 | 48.03 | 54.21 | 50.01 | 40.45 | 39.48 | 31.39 | 27.83 |
| I-17 | 35.04 | 48.26 | 49.15 | 51.10 | 42.13 | 38.31 | 33.57 | 31.19 | 27.83 |
| I-18 | 45.67 | 46.99 | 50.16 | 55.04 | 43.86 | 42.17 | 40.88 | 38.60 | 27.83 |
| I-19 | 47.12 | 39.21 | 37.51 | 53.07 | 40.45 | 43.05 | 42.06 | 40.69 | 27.83 |
| I-20 | 39.14 | 43.41 | 58.14 | 56.58 | 49.64 | 57.15 | 51.87 | 51.25 | 27.83 |
| I-21 | 37.40 | 38.52 | 62.93 | 60.72 | 58.89 | 60.28 | 56.70 | 58.41 | 27.83 |
| I-22 | 33.07 | 39.32 | 35.26 | 37.93 | 40.02 | 42.74 | 41.13 | 40.61 | 27.83 |
| I-23 | 65.40 | 60.09 | 38.27 | 41.82 | 39.05 | 40.67 | 40.30 | 43.49 | 27.83 |
| I-24 | 41.30 | 39.60 | 38.02 | 36.82 | 37.85 | 35.71 | 33.90 | 34.34 | 27.83 |
| DMF | 34.33 | 34.67 | 37.12 | 38.67 | 50.00 | 50.47 | 56.64 | 66.19 | 27.83 |

Example 41: Protective Effect of Compounds on HT-22 Cell Damage Caused by L-Glutamate Monosodium Salt Well-proliferated HT-22 cells, derived from mouse hippocampal neuronal cells in logarithmic growth phase, were selected, and they were counted after being subjected to trypsin digestion and dispersion. The cell density was adjusted with DMEM/F12 medium (containing 10% FBS and 1% double antibody). The cells were then inoculated in a 96-well plate at a density of 2,000 cells per well, and cultured in a cell incubator at 37° C. in atmosphere containing 5% $CO_2$ for 24 hours. For the control group and the L-glutamate monosodium salt group (model group), serum-free DMEM/F12 medium was added, and the other wells were added with tested compounds of different concentra- The effects of compound I-14, compounds 1-25 to 1-36 on the damage of HT-22 cells caused by L-glutamate monosodium salt are shown in Table 3. Experimental results indicated that, on the model of HT22 cell damage caused by the L-glutamate monosodium salt, all the tested compounds can reduce the damage of the L-glutamate monosodium salt to the HT22 cells, in other words, the tested compounds have the effect of protecting nerve cells. In particular, compounds 1-26, I-27, 1-28 and 1-30 perform better than the positive control drug DMF (dimethyl fumarate) in protecting cells. Particularly, the compounds I-26 and 1-28 perform far better than the positive control drug DMF (dimethyl fumarate) in protecting cells.

TABLE 3

Protective effect of compounds on HT-22 cell damage caused by L-glutamate monosodium salt

| Comp | Conc (μM) | | | | | | | | L-Glu |
|---|---|---|---|---|---|---|---|---|---|
| | 0.078 | 0.156 | 0.313 | 0.625 | 1.25 | 2.5 | 5 | 10 | |
| | Viabiality % | | | | | | | | |
| I-24 | 35.43 | 41.78 | 26.60 | 37.35 | 24.46 | 23.72 | 22.66 | 23.97 | 23.93 |
| I-25 | 43.00 | 38.37 | 26.19 | 29.57 | 21.89 | 24.55 | 24.17 | 27.01 | 23.93 |
| I-26 | 21.58 | 27.04 | 24.86 | 37.06 | 37.60 | 43.21 | 58.28 | 73.69 | 23.93 |
| I-27 | 20.04 | 37.17 | 39.60 | 47.52 | 56.24 | 60.24 | 55.34 | 55.45 | 23.93 |
| I-28 | 21.34 | 59.72 | 60.45 | 72.75 | 73.98 | 78.95 | 76.60 | 77.42 | 23.93 |
| I-29 | 44.51 | 51.76 | 45.39 | 46.26 | 41.73 | 38.96 | 34.45 | 31.80 | 23.93 |
| I-30 | 17.17 | 39.17 | 42.08 | 51.49 | 53.00 | 62.51 | 63.57 | 57.41 | 23.93 |
| I-31 | 48.48 | 39.07 | 31.05 | 32.55 | 23.43 | 22.26 | 22.34 | 22.11 | 23.93 |
| I-32 | 20.74 | 26.84 | 27.73 | 36.44 | 35.66 | 45.77 | 33.12 | 41.05 | 23.93 |
| I-33 | 29.63 | 35.11 | 27.73 | 30.42 | 28.17 | 31.85 | 35.54 | 38.55 | 23.93 |
| I-34 | 19.22 | 37.53 | 48.00 | 49.57 | 46.58 | 44.09 | 43.05 | 50.61 | 23.93 |
| I-35 | 38.86 | 55.25 | 43.95 | 41.47 | 38.23 | 39.31 | 29.73 | 30.92 | 23.93 |
| I-36 | 26.63 | 30.45 | 32.16 | 32.36 | 31.26 | 34.69 | 36.81 | 44.13 | 23.93 |
| DMF | 21.02 | 28.73 | 35.09 | 37.62 | 39.74 | 48.82 | 47.58 | 52.30 | 23.93 |

Example 42: Effect of Compound I-5 on Model of MPTP-Induced Parkinson's Disease Mouse: Improvement of Motor Dysfunction and Inhibition of Neurodegenerative Diseases in Mouse The core pathological change of Parkinson's disease is the loss of dopaminergic neurons. Tyrosine hydroxylase (TH), the rate-limiting enzyme in dopamine synthesis, is the landmark protein of the dopaminergic neurons. Therefore, the decrease in its level indicates the loss of the dopaminergic neurons. A key protein for the occurrence and development of Parkinson's disease is α-synuclein protein, and the abnormal modification (hyperphosphorylation) of this protein can inhibit microtubule polymerization, enhance oxidative stress, and thus accelerate the death of the dopaminergic neurons.

Male C57 mouse were screened for their motor function by a mouse rod-rotating test, and unqualified ones were excluded from the test. The qualified mouse were randomly divided into 6 groups according to their weight, including control group, model group, 1-5 (5 mg/kg, bid) group, 1-5 (10 mg/kg, bid) group, I-5 (20 mg/kg, bid) group and positive control drug L-DOPA (10 mg/kg, qd) group, with 15 animals in each group. MPTP was injected subcutaneously every 4 days in the model group and the drug administration group with a dosage of 25 mg/kg for 40 consecutive days. Each group of I-5 was administered once a day at 8:00 am and 8:00 pm (by intragastric administration), twice in total. The control group and model group were given the corresponding solvent once a day in the morning (by intragastric administration) while the positive control group (L-DOPA) was given L-DOPA once a day in the morning (by intragastric administration). The intragastric volume was 0.1 ml/10 g body weight, and the behavior test was started 40 days later. Compound I-5, the positive control drug levodopa (L-DOPA) and MPTP were prepared currently and ready to use. The storage time of the prepared liquid medicine was not more than 24 hours.

Pole-Climbing Test

A climbing pole in the pole-climbing test was a rough wooden pole with a diameter of 2 cm and a length of 50 cm. The bottom of the wooden pole was located in the mouse home cage and was vertically oriented. When the mouse was placed on top of the wooden pole, it would naturally descend to the bottom of the wooden pole and reach the base of the pole. Parkinson's disease was clinically characterized by motor dysfunction, so the time it took for a mouse with Parkinson's disease to reach the base of the wooden pole would be significantly prolonged. The mouse should have a pre-acclimation period of 2 days prior to the test, training five times a day. To the test day, the time required for the mouth to reach the bottom (incubation period) was taken as an evaluation index to observe the effect of the tested compound on the motion ability of the mouse.

Figure 2:
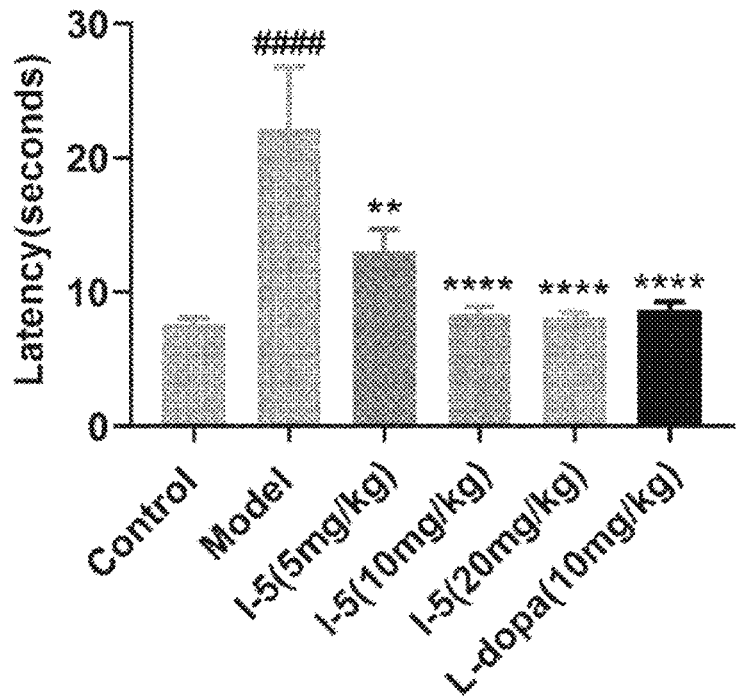
FIG. 2 shows the effect of I-5 on the latency of mouse in the pole-climbing test (mean±SEM). ####, P<0.0001 vs control group. , p<0.01;**, P<0.0001 vs model group. n=10-15.

As shown in FIG. 2, one-way ANOVA showed that drug treatment could significantly improve the latency of mouse in the pole-climbing test [$F (5, 73)=10.33$, $p<0.0001$]. Tukey's test results indicated that compared with the control group (n=15), the latency of mouse in the model group (n=10) reaching the base of the pole was significantly prolonged ($p<0.0001$), indicating a Parkinson's disease model was successful made. Compared with the model group, the positive control drug L-DOPA (10 mg/kg) could significantly shorten the latency of mouse reaching the base ($p<0.0001$, n=15). Treatment with the compound I-5 also significantly improved the motor dysfunction of mouse, which showed that the latency of mouse reaching the base of the wooden pole was significantly shortened, with a significant difference from the model group (5 mg/kg, n=12: $p<0.01$; 10 mg/kg, n=14 and 20 mg/kg, n=13: $p<0.0001$), indicating 1-5 had the effect of improving Parkinson's disease like dyskinesia induced by MPTP.

Rotarod Test

Mouse had an pre-acclimation period of 3 days on a Rotarod (IITC Life Science, USA) in advance. On the first day, the mouse acclimated to a rotating speed of 5 rpm for two times, each time for 5 minutes. On the second day, the rotarod turned at a speed of 10 rpm, the mouse acclimated to the speed for two times, each time for 5 minutes. On the third day, the rotarod turned at a speed of 15 rpm, the mouse acclimated to the speed for two times, each time for 3 minutes. On the fourth day, a behavioral test was started. The rotarod turned at a speed of 15 rpm for a period of 3 minutes. The time mouse spent on the rotarod (fall latency) was taken as an index for evaluation of their motor coordination. The test was repeated three times for each animal, with an interval of 30 minutes to eliminate the interference of exercise fatigue on the motion ability of animals.

Figure 3:
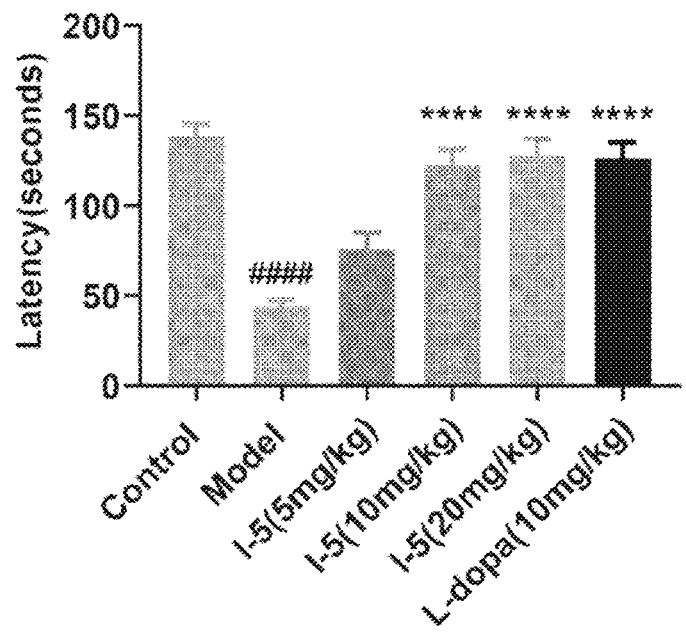
FIG. 3 shows the effect of I-5 on the fall latency of mouse in the bar-rotating test (mean±SEM). ####, P<0.0001 vs control group, ****, P<0.0001 vs model group. n=10-15.

As shown in FIG. 3, one-way ANOVA showed that drug treatment could significantly improve the fall latency of mouse in the Rotarod test [$F (5, 231)=17.98$, $p<0.0001$]. Tukey's test results indicated that compared with the control group (n=15), the latency of mouse in the model group (n=10) falling off the rotarod was significantly shortened ($p<0.0001$), indicating a Parkinson's disease model was successful made. When compared with the model group, the fall latency of mouse in the positive control drug L-DOPA (10 mg/kg) group was significantly prolonged ($p<0.0001$). Compared with the model group, the fall latency of mouse in medium and high dosage groups of compound I-5 was significantly prolonged ($p<0.0001$); when the dose was reduced to 5 mg/kg, there was no significant difference between the I-5 group and the model group ($p>0.05$), indicating that I-5 at a dosage of 10-20 mg/kg had the effect of improving Parkinson's disease like dyskinesia induced by MPTP.

Collection of Animal Brain Tissue

Tissues from all the animals were collected on the second day after the end of the behavioral experiment. Hearts from six animals in each group were perfused and fixed with paraformaldehyde for pathological analysis of paraffin sections. Brain tissue of the remaining animals was separated on ice, and brain areas (midbrain) related to Parkinson's disease were collected. After being frozen with liquid nitrogen, they were stored in a refrigerator at −80° C. for protein analysis. The level of tyrosine hydroxylase (TH), a marker protein of dopaminergic neurons, was detected by immunohistochemistry, and α-synuclein protein level and phosphorylation level of the protein were detected by Western blot.

Figure 4:
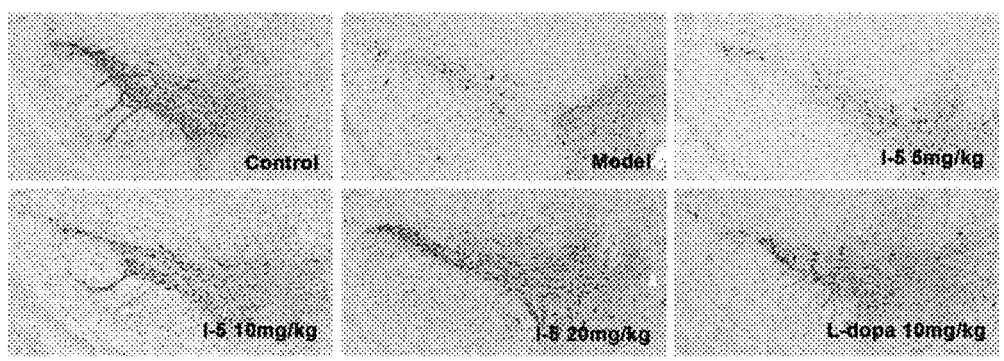
FIG. 4 shows the effect of I-5 on the level of a key enzyme (tyrosine hydroxylase, TH) for dopamine synthesis in the midbrain, ####, P<0.0001 vs control group. , p<0.01; *, P<0.001 vs model group. n=6.
Figure 4:
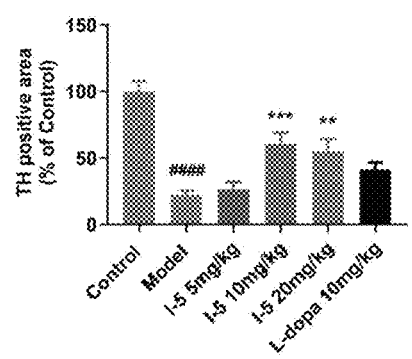

Effect of Compound I-5 on the Level of Tyrosine Hydroxylase (TH), a Key Enzyme for Dopamine Synthesis in the Midbrain As shown in FIG. 4, TH in substantia nigra of mouse in the control group was rich in expression, showing a complete structure of substantia nigra. Compared with the control group, the TH positive area of substantia nigra in the model group was significantly reduced ($p<0.0001$), indicating that the dopamine synthesis capacity was significantly reduced, and the number of dopaminergic neurons was significantly reduced. Compared with the model group, treatment with medium and high dosage of compound 1-5 can significantly increase the TH positive area, indicating that the number of dopaminergic neurons was significantly increased. There was no significant difference in the TH positive area between the positive control drug L-DOPA group and the model group.

Figure 5:
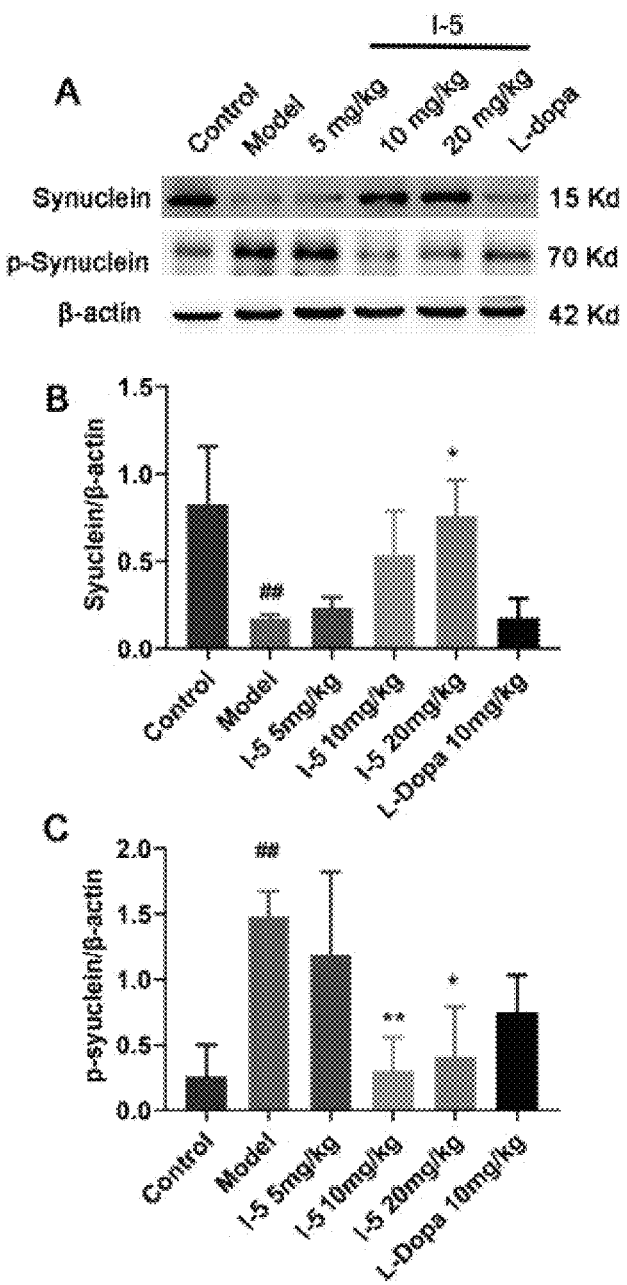
FIG. 5 shows effects of I-5 on α-synuclein protein level and its phosphorylation in the midbrain. A: a representative picture of effects of I-5 on the α-synuclein and p-synuclein protein levels in the midbrain. B: statistical analysis of the effect of I-5 on α-synuclein protein level in the midbrain; C: statistical analysis of the effect of I-5 on the p-synuclein protein level in the midbrain. ##, P<0.01 vs control group. *, p<0.05; **, P<0.01 vs model group. n=3.

Effects of Compound I-5 on α-Synuclein Protein Level in Midbrain and Phosphorylation of the Protein Effects of compound I-5 on α-synuclein protein level in midbrain of mouse was shown in FIG. 5B. One-way ANOVA showed that drug treatment had a significant effect on the α-synuclein protein level in the midbrain [F (5,12)=6.927, p=0.0029]. Dunnett's test showed that compared with the control group, α-synuclein protein level in the midbrain of mouse in the model group was significantly decreased (p<0.01), and the positive control drug L-DOPA (10 mg/kg) had no significant effect on the α-synuclein protein level in the midbrain of mouse (p>0.05). The α-synuclein protein level in the midbrain of animals in the high dosage treatment group of compound 1-5 was significantly higher than that of the model group (p<0.05), indicating that compound I-5 could enhance the physiological status α-synuclein protein level.

Effects of compound 1-5 on phosphorylation of the α-synuclein (p-synuclein) protein level in midbrain of mouse was shown in FIG. 5C. One-way ANOVA showed that drug treatment had a significant effect on the p-synuclein protein level in the midbrain [F (5,12)=5.864, p=0.0057]. Dunnett's test showed that compared with the control group, p-synuclein protein level in the midbrain of mouse in the model group was significantly increased (p<0.01); the positive control drug L-DOPA (10 mg/kg) had no significant effect on the p-synuclein protein level in the midbrain of mouse (p>0.05); the p-synuclein protein level in the midbrain of animals in the high dosage treatment group of compound I-5 was significantly lower than that in the model group (10 mg/kg: p<0.01; 20 mg/kg: p<0.05), indicating that the compound I-5 had an effect of inhibiting phosphorylation modification of the α-synuclein protein.

In conclusion, compound 1-5 can not only improve Parkinson's disease like dyskinesia in mouse induced by MPTP, but also significantly inhibit neurodegenerative diseases induced by MPTP, with effective doses of 10 mg/kg and 20 mg/kg. Compared with the positive control drug L-DOPA, compound I-5 has significant advantages and has the potential to become a new drug for treating the Parkinson's disease.

Example 43: Protective Effect of Compound I-5 HCl (I-5 Hydrochloride) on SH-SY5Y Cell Damage Caused by Oxygen-Glucose Deprivation/Reperfusion—In Vitro Model Experiment of Ischemic Stroke Preparation of oxygen-free Earle's equilibrium salt solution: the Earle's equilibrium salt solution was filled with nitrogen for 30 minutes, dissolved oxygen was removed from the liquid by using nitrogen bubbling, then it was sealed for use.

SH-SY5Y cells in logarithmic growth phase were selected, the culture medium was discarded, the cells were digested with 0.25% Trypsin containing EDTA, and cell suspension was made. Cell density was adjusted to 30,000/ml with DMEM/F12 medium (containing 10% FBS and 1% double antibody) and it was inoculated to 96-well plate, 100 µL/well, the number of cells per well was 3,000, and the cells were cultured in a cell incubator at 37° C. in an atmosphere containing 5% $CO_2$ for 24 hours. After 24 hours, the cells were washed twice with the Earle's solution. For the control group, 100 µL oxygenated Earle's solution was added in each well, and for the remaining groups, 100 µL oxygen-free Earle's solution after nitrogen bubbling was added, and the oxygen content in an anoxic chamber was kept below 0.5%, and models were made in the cell incubator for 4 hours. After 4 hours, content in each well was replaced with 90 µL DMEM/F12 medium containing 10% serum, then 10 µL serum-free DMEM/F12 medium was added to each well of the control group and the model group, and different concentrations of 1-5 HCl and the positive control drug Edaravone were added to the remaining wells respectively, so that the final concentration of the tested compounds was 10 µM, 5 µM, 2.5 µM, 1.25 µM, 0.625 µM, 0.313 M, 0.156 µM, 0.078 µM, respectively, and each concentration was repeated for three wells. After 24 hours, CCK-8 cell viability test kit was used to detect the cell viability.

As shown in Table 4, oxygen-glucose deprivation/reperfusion can reduce the cell vitality to 56.83% of the control group, which exhibits a significant damage. When the concentration of compound 1-5 HCl is in a range from 0.078 µM to 0.625 µM, it can increase the cell viability to 74.72% in a concentration dependent manner. Then the cell viability is gradually decreased with the increase of the concentration. When the concentration of Edaravone is in a range from 0.078 µM to 1.25 µM, the therapeutic effect is not as good as that of I-5 HCl at the same concentration. Edaravone has the best therapeutic effect when its dosage is 10 µM, and the cell viability is 67.39%, which is not as good as the best therapeutic effect of 1-5 HCl.

TABLE 4

Protective effect of compound I-5 HCl on SH-SY5Y cell damage caused by oxygen-glucose deprivation/reperfusion

| Comp | Conc (µM) | | | | | | | | |
|---|---|---|---|---|---|---|---|---|---|
| | 0.078 | 0.156 | 0.313 | 0.625 | 1.25 | 2.5 | 5 | 10 | Model |
| | Viabiality % | | | | | | | | |
| I-5 HCl | 67.72 | 67.82 | 69.35 | 74.72 | 70.18 | 61.16 | 59.01 | 60.32 | 56.83 |
| Edaravone | 59.41 | 62.42 | 62.14 | 62.78 | 62.33 | 64.94 | 64.57 | 67.39 | 56.83 |

The above descriptions are only embodiments of the application and is not intended to limit the application. For those skilled in the art, the application may have various changes and variations. Any modification, equivalent replacement, improvement, etc. made within the spirit and principle of this application shall be included in the scope of claims of this application.

What is claimed is:

1. A method for treating diseases associated with Nrf2 activators, comprising: administering to a subject in need thereof a therapeutically effective amount of a compound of Formula (I)

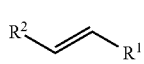
(I)

or a pharmaceutically acceptable salt thereof, wherein,
$R^1$ is —COOR$^3$, —CONR$^4$R$^5$, —CON(OCH$_3$)CH$_3$, —CONHCOOR$^6$ or —CN;
$R^3$ is $C_1$-$C_6$ alkyl;
$R^4$ and $R^5$ are independently selected from hydrogen or $C_1$-$C_6$ alkyl;
$R^6$ is $C_1$-$C_6$ alkyl;
wherein $R^2$ is pyridinyl, pyridinyl substituted with 1-4 $R^7$, pyrimidinyl, pyrimidinyl substituted with 1-3 $R^8$, imidazolyl, imidazolyl substituted with 1-3 $R^9$, oxazolyl, oxazolyl substituted with 1-2 $R^{10}$, thiazolyl, or thiazolyl substituted with 1-2 $R^{11}$, and wherein;
$R^7$ is $C_1$-$C_6$ alkyl;
$R^8$ is $C_1$-$C_6$ alkyl;
$R^9$ is $C_1$-$C_6$ alkyl;
$R^{10}$ is $C_1$-$C_6$ alkyl;
$R^{11}$ is $C_1$-$C_6$ alkyl;
and
the carbon-carbon double bond of Formula (I) is E configurational.

2. The method of claim 1, wherein each of $R^3$, $R^4$, $R^5$ and $R^6$ is independently selected from methyl or ethyl.

3. The method of claim 1, wherein $R^2$ is selected from the group consisting of pyridinyl, pyrimidinyl, imidazolyl, 1-methylimidazol-2-yl, oxazolyl, oxazolyl substituted with methyl, thiazolyl and thiazolyl substituted with methyl.

4. The method of claim 1, wherein each of $R^3$, $R^4$, $R^5$ and $R^6$ is independently selected from methyl or ethyl, and $R^2$ is pyridinyl.

5. The method of claim 1, wherein each of $R^3$, $R^4$, $R^5$ and $R^6$ is independently selected from methyl or ethyl, and $R^2$ is oxazolyl substituted with methyl.

6. The method of claim 1, wherein each of $R^3$, $R^4$, $R^5$ and $R^6$ is independently selected from methyl or ethyl, and $R^2$ is thiazolyl substituted with methyl.

7. The method of claim 1, wherein $R^1$ is —COOCH$_3$, —COOCH$_2$CH$_3$, —CON(OCH$_3$)CH$_3$, —CON(CH$_3$)$_2$ or —CN, and $R^2$ is pyridinyl.

8. The method of claim 1, wherein $R^1$ is —COOCH$_3$, —COOCH$_2$CH$_3$, —CON(OCH$_3$)CH$_3$, —CON(CH$_3$)$_2$ or —CN, and $R^2$ is oxazolyl substituted with methyl.

9. The method of claim 1, wherein $R^1$ is —COOCH$_3$, —COOCH$_2$CH$_3$, —CON(OCH$_3$)CH$_3$, —CON(CH$_3$)$_2$ or —CN, and $R^2$ is thiazolyl substituted with methyl.

10. The method of claim 1, wherein the compound of Formula (I) is selected from

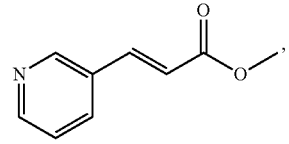
I-1

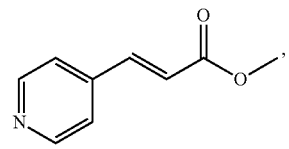
I-2

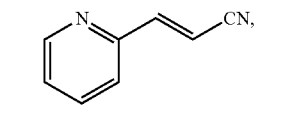
I-3

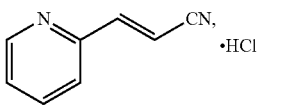
I-4

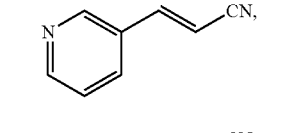
I-5

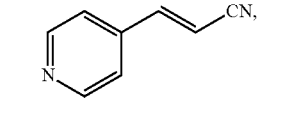
I-5 HCl

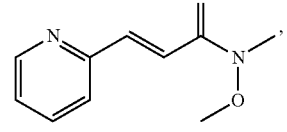
I-6

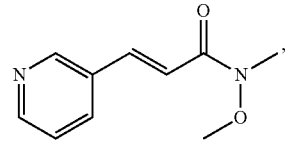
I-7

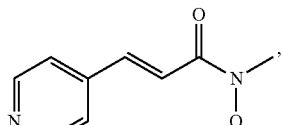
I-8

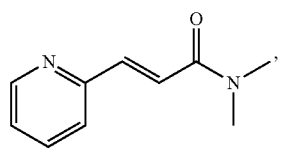
I-9

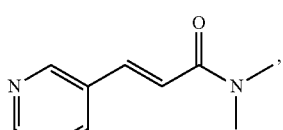
I-10

I-11

I-12

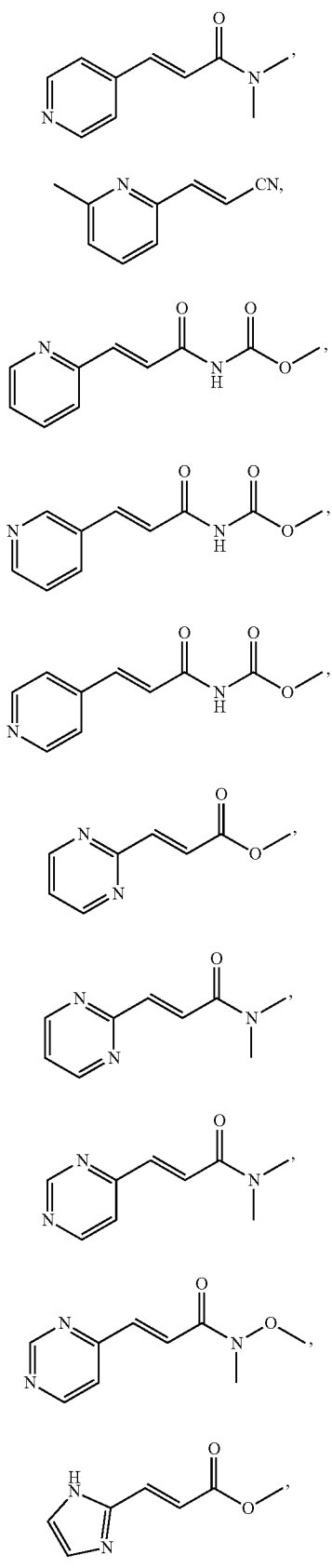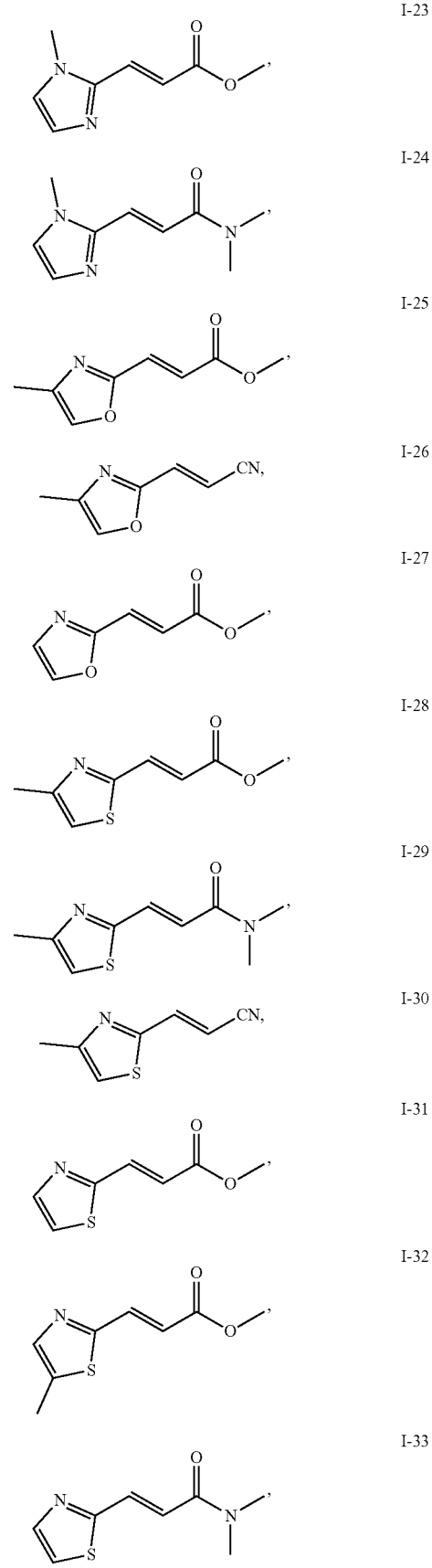

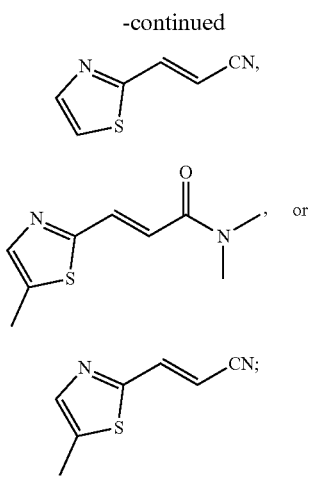

or at pharmaceutically acceptable salt thereof.

11. A method for treating diseases associated with Nrf2 activators, comprising: administering to a subject in need a pharmaceutical composition comprising an effective dosage of the compound of Formula (I),

or a pharmaceutically acceptable salt thereof and a pharmaceutically acceptable carrier thereof,
wherein,
$R^1$ is —COOR$^3$, —CONR$^4$R$^5$, —CON(OCH$_3$)CH$_3$, —CONHCOOR$^6$ or —CN;
$R^3$ is $C_1$-$C_6$ alkyl;
$R^4$ and $R^5$ are independently selected from hydrogen or $C_1$-$C_6$ alkyl;
$R^6$ is $C_1$-$C_6$ alkyl;
wherein $R^2$ is pyridinyl, pyridinyl substituted with 1-4 $R^7$, pyrimidinyl, pyrimidinyl substituted with 1-3 $R^8$, imidazolyl, imidazolyl substituted with 1-3 $R^9$, oxazolyl, oxazolyl substituted with 1-2 $R^{10}$, thiazolyl, or thiazolyl substituted with 1-2 $R^{11}$, and wherein;
$R^7$ is $C_1$-$C_6$ alkyl;
$R^8$ is $C_1$-$C_6$ alkyl;
$R^9$ is $C_1$-$C_6$ alkyl;
$R^{10}$ is $C_1$-$C_6$ alkyl;
$R^{11}$ is $C_1$-$C_6$ alkyl;
and
the carbon-carbon double bond of the Formula (I) is E configurational.

12. The method of claim 11, wherein the diseases associated with Nrf2 activators are neurodegenerative diseases.

13. The method of claim 12, wherein the neurodegenerative diseases comprise multiple sclerosis (MS), Alzheimer's disease (AD), Parkinson's disease (PD), Huntington's disease (HD), amyotrophic lateral sclerosis (ALS), Friedrich's ataxia (FRDA), spinal muscular atrophy (SMA), neuromyelitis optica (NMO), and spinocerebellar ataxia (SCA).

14. The method of claim 11, wherein the diseases associated with Nrf2 activators are cardiovascular and cerebrovascular diseases, respiratory diseases, autoimmune diseases, diabetes, nephropathy or eye diseases; wherein the cardiovascular and cerebrovascular diseases comprise stroke, atherosclerosis, hypertension and heart failure; the respiratory diseases comprise chronic obstructive pulmonary disease (COPD), asthma, fibrosis, chronic and acute asthma, lung diseases secondary to environmental exposure, acute lung infection and chronic lung infection; the autoimmune diseases comprise multiple sclerosis (MS), inflammatory bowel disease, internal rheumatoid arthritis, psoriasis, vitiligo, systemic lupus erythematosus, Hashimoto's thyroiditis and inflammatory diseases; the nephropathy comprises diabetic nephropathy, chronic nephropathy and acute renal injury; and the eye diseases comprise age-related macular degeneration (AMD), diabetic retinopathy (DR) and uveitis.

15. The method of claim 11, wherein the mode of administration comprises oral administration, intravenous administration, inhalation administration or topical administration.

16. The method of claim 1, wherein the diseases associated with Nrf2 activators are neurodegenerative diseases.

17. The method of claim 16, wherein the neurodegenerative diseases comprise multiple sclerosis (MS), Alzheimer's disease (AD), Parkinson's disease (PD), Huntington's disease (HD), amyotrophic lateral sclerosis (ALS), Friedrich's ataxia (FRDA), spinal muscular atrophy (SMA), neuromyelitis optica (NMO), and spinocerebellar ataxia (SCA).

18. The method of claim 1, wherein the diseases associated with Nrf2 activators are cardiovascular and cerebrovascular diseases, respiratory diseases, autoimmune diseases, diabetes, nephropathy or eye diseases; wherein the cardiovascular and cerebrovascular diseases comprise stroke, atherosclerosis, hypertension and heart failure; the respiratory diseases comprise chronic obstructive pulmonary disease (COPD), asthma, fibrosis, chronic and acute asthma, lung diseases secondary to environmental exposure, acute lung infection and chronic lung infection; the autoimmune diseases comprise multiple sclerosis (MS), inflammatory bowel disease, internal rheumatoid arthritis, psoriasis, vitiligo, systemic lupus erythematosus, Hashimoto's thyroiditis and inflammatory diseases; the nephropathy comprises diabetic nephropathy, chronic nephropathy and acute renal injury; and the eye diseases comprise age-related macular degeneration (AMD), diabetic retinopathy (DR) and uveitis.

19. The method of claim 1, wherein the mode of administration comprises oral administration, intravenous administration, inhalation administration or topical administration.

20. A method for treating Parkinson's disease, comprising: administering to a subject in need thereof a therapeutically effective amount of a Compound I-5

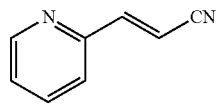

or a pharmaceutically acceptable salt thereof.